United States Patent [19]

Imaoka et al.

[11] Patent Number: 5,673,133
[45] Date of Patent: Sep. 30, 1997

[54] PHASE SYNCHRONIZATION SYSTEM

[75] Inventors: Atsushi Imaoka, Zushi; Masami Kihara, Kamakura, both of Japan

[73] Assignee: Nippon Telegraph and Telephone Corporation, Tokyo, Japan

[21] Appl. No.: 624,360

[22] Filed: Apr. 11, 1996

[30] Foreign Application Priority Data

Apr. 14, 1995 [JP] Japan ................................. 7-089855

[51] Int. Cl.6 ........................... H04B 10/00; H04B 10/06
[52] U.S. Cl. ............................ 359/189; 359/158; 359/161; 356/73.1; 375/362
[58] Field of Search ................................. 359/189, 191, 359/195, 183, 153, 158, 173; 356/73.1; 375/371, 373, 375, 362

[56] References Cited

U.S. PATENT DOCUMENTS

| | | | |
|---|---|---|---|
| 3,654,473 | 4/1972 | Nussmeier | 359/156 |
| 4,287,606 | 9/1981 | Lutes, Jr. et al. | 359/161 |
| 4,295,741 | 10/1981 | Palma et al. | 356/349 |
| 4,754,452 | 6/1988 | Henry | 359/183 |
| 4,984,884 | 1/1991 | Ryu et al. | 356/73.1 |
| 5,115,332 | 5/1992 | Naito et al. | 359/189 |
| 5,267,072 | 11/1993 | Maleki | 359/183 |
| 5,280,376 | 1/1994 | Takahashi et al. | 359/161 |
| 5,471,332 | 11/1995 | Shiragaki et al. | 359/117 |

*Primary Examiner*—Wellington Chin
*Assistant Examiner*—Rafael Bacares
*Attorney, Agent, or Firm*—Finnegan, Henderson, Farabow, Garrett & Dunner, L.L.P.

[57] ABSTRACT

The invention has the object of offering a phase synchronization system for wavelength division multiplexed bi-directional communications systems which can perform high-precision phase synchronization between a master device and a slave device without being affected by chromatic dispersion within the optical transmission medium. FIG. 1 is a block diagram showing the structure of an embodiment of the phase synchronization system of the invention. The phase synchronization system switches between phase difference measurement between optical signals of two different wavelengths which propagate in opposite directions and phase difference measurement between optical signals of the two different wavelengths which propagate in the same direction. By comparing the data indicating the phase difference, the system determines the delay time between the master device and the slave device.

15 Claims, 10 Drawing Sheets

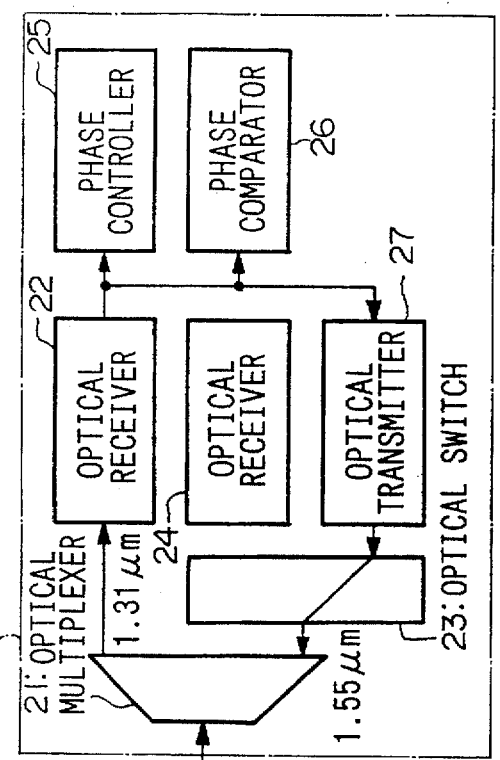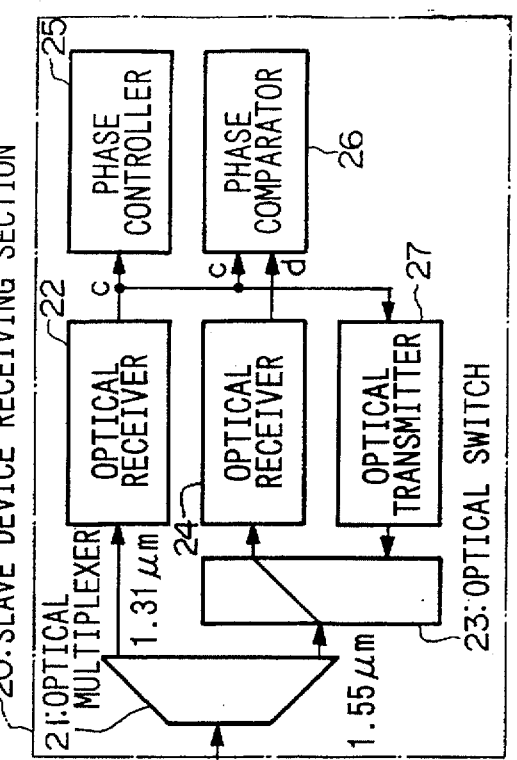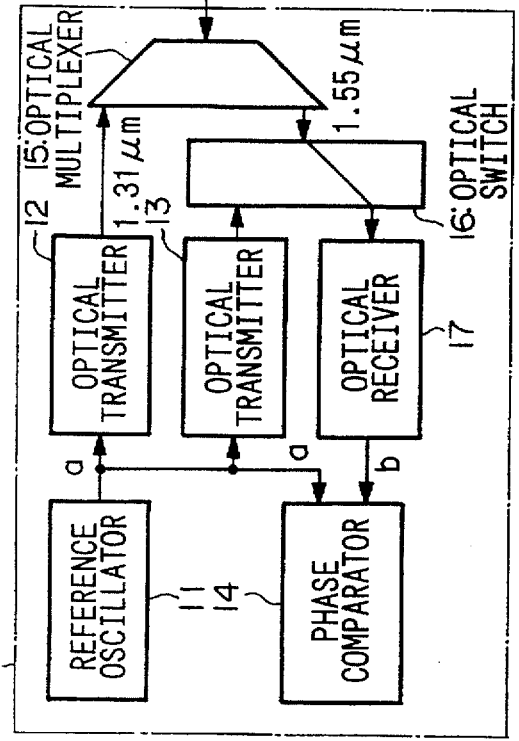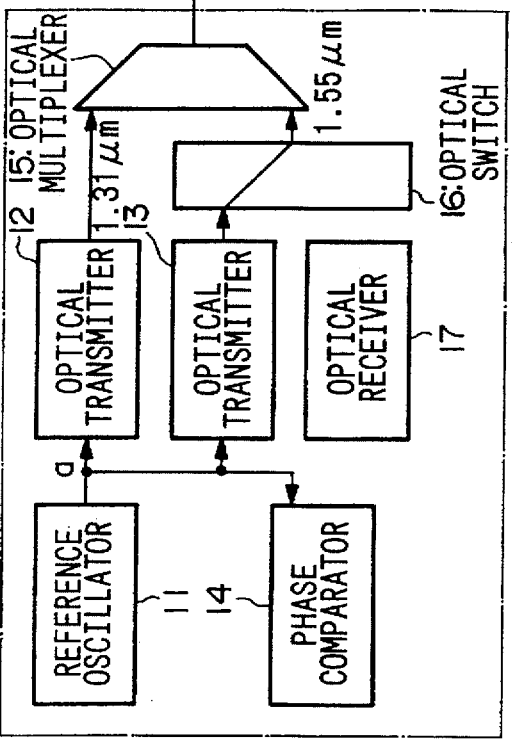
FIG.2A
FIG.2B

PHASE SYNCHRONIZATION SYSTEM

BACKGROUND OF THE INVENTION

1. Technical Field of the Invention

The present invention relates to phase synchronization systems for synchronizing the phase between master devices and slave devices connected by means of optical transmission lines in wavelength division multiplexing bi-directional transmission systems, and apparatus for constructing such phase synchronization systems.

2. Background Art

Among the conventional methods for synchronizing the phase between master devices and slave devices connected by means of optical transmission lines, a method is known wherein a turnaround optical transmission line is used to measure the delay time for an optical signal to complete a circuit between the master device and the slave device so as to make the one-way delay time equal to half the measured delay time, and the phase is corrected based on this one-way delay time.

FIG. 10 is a block diagram showing an example of the structure of a conventional phase synchronization system. In the diagram, a master device transmitting section 110 and a slave device receiving section 120 are connected by means of two optical transmission line 101 and 102.

A reference phase signal a generated by a reference oscillator 111 in the master device transmitting section 110 passes through the optical transmission line 101 which is the outgoing line, and is inputted to the slave device receiving section 120. At this time, the reference phase signal a changes to phase signal b due to the change in phase caused by the transmission time delay.

The phase signal b sent to the slave device receiving section 102 is inputted to a phase controller 121 and is also returned to the master device transmitting section 110 via the optical transmission line 102 which is the incoming line. At this time, the phase signal b changes to phase signal c due to the change in phase caused by the transmission time delay.

The phase signal c which is returned to the master device transmitting section 110 is inputted to a phase comparator 112. The phase comparator 112 measures the phase difference $\Delta D$ between the reference phase signal a and the phase signal c.

In this case, phase difference $\Delta D$ is able to be calculated from the following formula:

$$\Delta D = T_1 + T_2 \quad (1)$$

wherein $T_1$ refers to the delay time in the outgoing optical transmission line 101 and $T_2$ refers to the delay time in the incoming optical transmission line 102. As a result, the one-way delay time $\Delta T$ measured by the phase comparator 112 can be calculated as follows:

$$\Delta T = \Delta D/2 = T_1 + (T_2 - T_1)/2 \quad (2)$$

While the outgoing optical transmission line 101 and the incoming optical transmission line 102 are contained in physically independent optical fiber cores in this case, they are often contained within the same optical fiber cable (which contain multiple fibers). Therefore, their lengths are approximately equal:

$$T_1 = T_2$$

and consequently:

$$(T_2 - T_1)/2 = 0$$

Therefore, the delay time $\Delta T$ is held to be equal to the delay time $T_1$, and this is sent to the slave device receiving section 120 as delay data e. The phase controller 121 of the slave device receiving section 120 controls the phase of the phase signal b based on this delay data e. As a result, the master device transmitting section 110 and the slave device receiving section 120 are able to be phase synchronized.

Additionally, as methods for transmitting bi-directional signals using a single optical fiber core line, there are bi-directional communication systems which use two optical beams of different wavelengths. FIG. 11 is a block diagram showing an example of the structure of a wavelength division multiplexing bi-directional communication system. In the diagram, two communication devices 210 and 220 are connected by a single optical transmission line 201. The optical transmitter 211 of the communications device 211 communicates with the optical receiver 221 of the communications device 220 by means of an optical signal of wavelength $\lambda_1$. Additionally, the optical transmitter 222 of the communications device 220 communicates with the optical receiver 212 of the communications device 210 by means of an optical signal of wavelength $\lambda_2$ ($\neq \lambda_1$). The optical signals of wavelengths $\lambda_1$ and $\lambda_2$ are combined and separated by means of the wavelength division multiplexers 213 and 223. In the system shown in FIG. 11, efficient communications are possible due to the simultaneous bi-directional communications which use a single optical transmission line 201.

However, with the conventional phase synchronization system shown in FIG. 10, formula (2) has an associated error which is equal to one half the difference between the delay time $T_1$ of the outgoing optical transmission line 101 and the delay time $T_2$ of the incoming optical transmission line 102, i.e. an error of $(T_2 - T_1)/2$.

In present-day optical fiber communications over telephone networks, optical fiber cables with several to several hundred optical fiber core lines contained within each cable are used. For this reason, the probability is high that the outgoing optical fiber core line and the incoming optical fiber core line are contained within the same optical fiber cable.

However, even if the outgoing fiber core line and the incoming fiber core line are contained within the same optical fiber cable, the outgoing and incoming optical fiber lengths can often be different due to differences in the positions of connectors at the terminal portions of the optical fiber cable or the positions of the transmitters or receivers within the terminal devices. Additionally, in long-distance communications which pass through multiple devices such as relay devices, the difference in length between the outgoing line and the incoming line can become even greater. For example, in a transmission line of approximately 2000 km, the difference between the outgoing delay time and the incoming delay time can be expected to be about 100 ns. A delay time difference of such a length cannot be ignored when carrying out high-precision phase synchronization. This presents a problem in the conventional phase synchronization system shown in FIG. 10.

In the wavelength division multiplexing bi-direction communication system shown in FIG. 11, the transmission time of the optical signals in the optical fibers are different because of their different wavelengths, due to chromatic dispersion in the optical fibers. For example, even with dispersion shifted fibers which have been adjusted so that the chromatic dispersion is approximately zero at a wavelength of 1.55 μm, a chromatic dispersion of 2.5 ps/nm·km can be expected in the wavelength band of 1.54 μm–1.56 μm. With this level of chromatic dispersion, delay time differences of a maximum of 25 ns can occur when an optical transmission is made over 1000 km using two optical signals having wavelengths which are 10 nm apart. Such a delay time difference cannot be ignored in performing high-precision phase synchronization, so that the wavelength division multiplexing bi-directional communication system cannot simply be combined with a conventional phase synchronization system.

SUMMARY OF THE INVENTION

The present invention has the object of offering, in a wavelength division multiplexing bi-directional communication system, a phase synchronization system which performs high-precision phase synchronization between a master device and a slave device without being influenced by wavelength dispersion on the optical transmission lines.

The phase synchronization system of the present invention has a structure wherein the phase difference between two optical signals of different wavelengths propagating in the opposition direction during wavelength division multiplexed bi-directional communications and the phase difference between two optical signals of different wavelengths propagating in the same direction during wavelength division multiplexed bi-directional communications are measured by switching therebetween, and their phase difference data are compared to determine the delay time between the master device and the slave device.

The present invention offers a phase synchronization system having a receiving device and a transmitting device connected by means of an optical fiber. The receiving device comprises an optical multiplexer for receiving optical signals from an optical fiber connected to a transmitting device provided in a master or slave device, and separating said optical signals into optical signals of a first wavelength $\lambda_1$ and optical signals of a second wavelength $\lambda_2$; a first optical receiver for separating first phase signals from said optical signals of wavelength $\lambda_1$; a second optical receiver for separating second phase signals from said optical signals of wavelength $\lambda_2$; a phase comparator for determining a phase difference between said first phase signals and said second phase signals, by determining a difference between a first delay time for said optical signals of wavelength $\lambda_1$ to travel from said transmitting device to the present device and a second delay time for said optical signals of wavelength $\lambda_2$ to travel from said transmitting device to the present device, and outputting second phase difference data indicating said phase difference; an optical transmitter for generating optical signals of wavelength $\lambda_2$ modulated by said first phase signals, and sending said optical signals through said optical multiplexer to said optical fiber; an optical switch for switching between a first state wherein optical signals of wavelength $\lambda_2$ generated by said optical transmitter are inputted into said optical multiplexer and a second state wherein optical signals of wavelength $\lambda_2$ separated by said optical multiplexer are inputted into said second optical receiver; a data transfer section for receiving switch control signals for switching between the states of said optical switch and first phase difference data indicating the sum of said first delay time and said second delay time; a control section for controlling the state of said optical switch based on said switch control signals received by said data transfer section; a delay time calculation section for determining a first delay time by adding the values of said first phase difference data and said second phase difference data, and dividing the resulting sum by 2; and a phase control section for generating phase signals synchronized with reference phase signals generated by said transmitting device by adjusting the phase of said first phase signals based on said first delay time determined by said delay time calculation section. The transmitting device comprises a reference oscillator for generating reference phase signals; a first optical transmitter for generating optical signals of a first wavelength $\lambda_1$ modulated by the reference signals generated by said reference oscillator; a second optical transmitter for generating optical signals of a second wavelength $\lambda_2$ modulated by the reference signals generated by said reference oscillator; an optical multiplexer for combining the optical signals of wavelength $\lambda_1$ generated by said first optical transmitter and the optical signals of wavelength $\lambda_2$ generated by said second optical transmitter, sending the combined optical signals to an optical fiber connected to a receiving device provided in a slave device, receiving optical signals from said optical fiber, and separating optical signals of wavelength $\lambda_2$ from the received optical signals; an optical receiver for separating phase signals from said optical signals of wavelength $\lambda_2$ separated by said optical multiplexer; a phase comparator for determining a phase difference between said reference phase signals and said separated phase signals, by determining the sum of a first delay time for said optical signals of wavelength $\lambda_1$ to travel from the present device to said receiving device and a second delay time for said optical signals of wavelength $\lambda_2$ to travel from said receiving device to the present device, and outputting first phase difference data indicating said phase difference; an optical switch for switching between a first state wherein optical signals of wavelength $\lambda_2$ separated by said optical multiplexer are inputted into said optical receiver and a second state wherein optical signals of wavelength $\lambda_2$ generated by said second optical transmitter are inputted into said optical multiplexer; a control section for controlling the state of said optical switch and outputting switch control signals indicating the control state; and a data transfer section for sending out said switch control signals outputted by said control section and said first phase difference data outputted by said phase comparator.

According to the present invention, in a first state, phase signals are reciprocated between the master device and the slave device by transmitting a reference phase signal by means of an optical signal of wavelength $\lambda_1$ from the master device to the slave device and returning a phase signal by means of an optical signal of wavelength $\lambda_2$ from the slave device to the master device. A phase comparator in the master device compares the phases of the reference phase signal and the returned phase signal. The phase difference obtained in this way is the sum of the delay time corresponding to wavelength $\lambda_1$ and the delay time corresponding to wavelength $\lambda_2$ in the optical transmission line.

On the other hand, in a second state, a reference phase signal is transmitted from the master device to the slave device by means of an optical signal of wavelength $\lambda_1$ and an optical signal of wavelength $\lambda_2$. The phase comparator in the slave device compares the phase of the phase signals separated into the optical signals of each wavelength. The phase difference obtained in this case is the difference in delay time between the delay time corresponding to wavelength $\lambda_1$ and the delay time corresponding to wavelength $\lambda_2$ in the optical transmission lines.

Since two unknown values can be calculated if their sum and their difference are known, the sum determined in the first state and the difference determined in the second state can be used to provide an accurate measurement of the delay time for wavelength $\lambda_1$ and the delay time for wavelength $\lambda_2$ in the optical transmission lines.

Consequently, the delay time for each wavelength is able to be accurately measured even if there are differences in the delay time depending upon the wavelengths in the optical transmission lines (chromatic dispersion), so as to be able to perform a high-precision phase synchronization between the master device and the slave device. Additionally, if the present invention is applied to a reference clock distribution network within a digital communication network, then the clock distribution is able to be performed without the influence of delay times due to propagation in the clock distribution transmission lines, so that the accuracy in the reference clock distribution network is able to be easily maintained.

Furthermore, conventional phase synchronization systems (see FIG. 10) require two transmission media, which presents a problem not only in terms of phase synchronization accuracy, but also in terms of the efficiency of the transmission media and economics. The present invention is able to perform high-precision phase synchronizations with only a single transmission medium, so it prevents an improvement over conventional phase synchronization systems from the standpoint of economics as well.

BRIEF DESCRIPTION OF THE DRAWINGS

FIG. 2A is a diagram showing the first state of a phase synchronization system according to the first embodiment of the present invention.

FIG. 2B is a diagram showing the second state of a phase synchronization system according to the first embodiment of the present invention.

PREFERRED EMBODIMENTS OF THE INVENTION

Hereinbelow, the embodiments of the present invention will be explained with reference to the drawings.

[First Embodiment]

Figure 1:
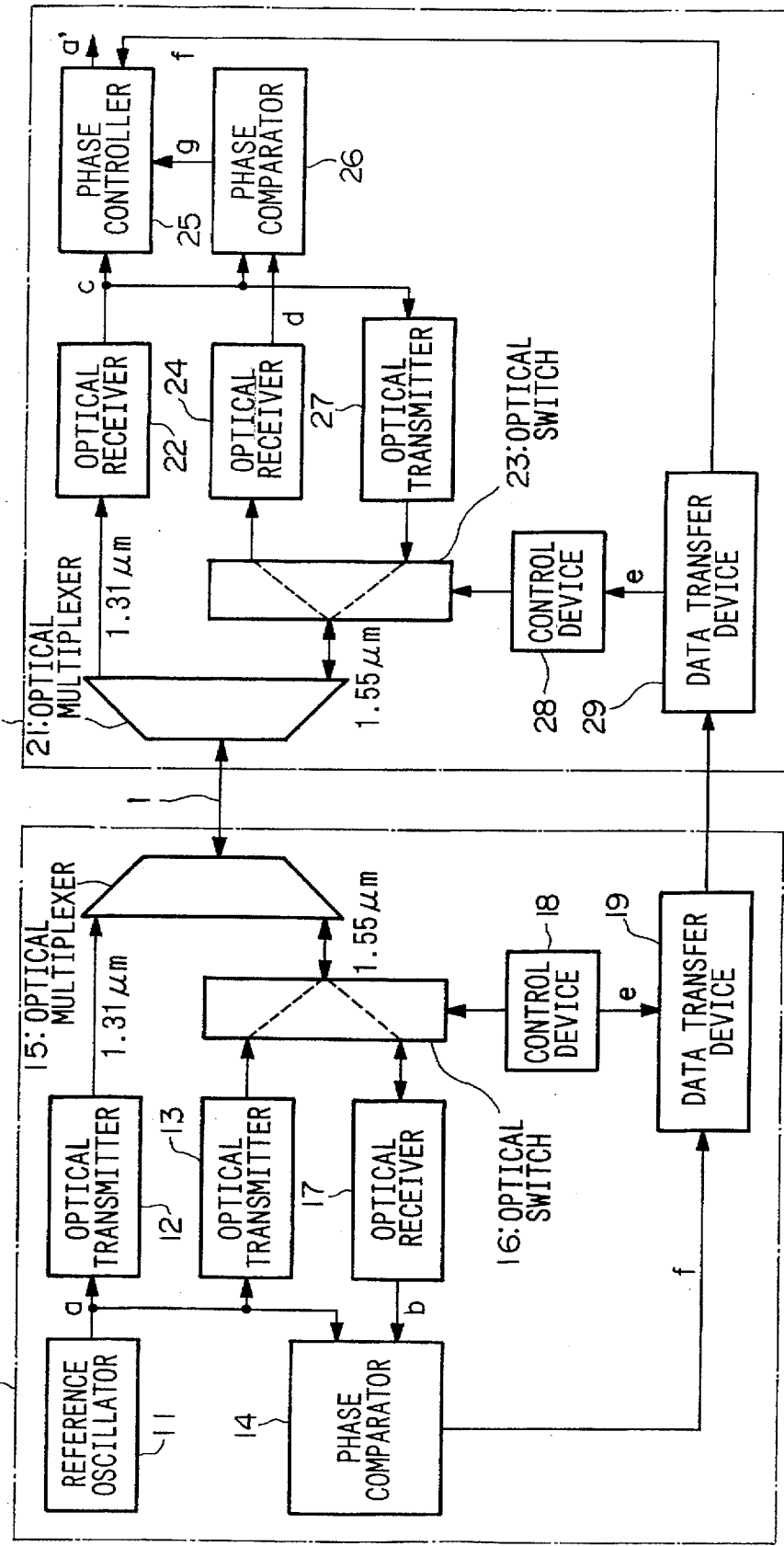
FIG. 1 is a block diagram showing the structure of a phase synchronization system according to the first embodiment of the present invention.

FIG. 1 is a block diagram showing the structure of a phase synchronization system according to the first embodiment of the present invention. In the diagram, a master device transmitting section 10 and a slave device receiving section 20 are connected by means of an optical fiber 1.

At the master device transmitting section 10, a reference oscillator 11 outputs a reference phase signal a, which is inputted to optical transmitters 12, 13 and a phase comparator 14. The optical transmitter 12 sends an optical signal of wavelength 1.31 μm modified by the reference phase signal a to the optical fiber 1 via an optical multiplexer 15. The optical transmitter 13 sends an optical signal of wavelength 1.55 μm modified by the reference phase signal a to the optical fiber 1 via an optical switch 16 and the optical multiplexer 15. Additionally, the optical signal of wavelength 1.55 μm inputted from the optical fiber passes through the optical multiplexer 15 and the optical switch 16 and is inputted to an optical receiver 17. The optical receiver 17 separates a phase signal b from the inputted optical signal of wavelength 1.55 μm and inputs the phase signal b to the phase comparator 14. A control device 18 generates a switch control signal e for controlling the optical switch 16 and inputs the switch control signal e to a data transfer device 19. The data transfer device 19 sends the switch control signal e and phase difference data f outputted from the phase comparator 14 to the slave device receiving section 20.

At the slave device receiving section 20, the optical signal of wavelength 1.31 μm inputted from the optical fiber 1 is inputted to an optical receiver 22 via an optical multiplexer 21. Additionally, the optical signal of wavelength 1.55 μm inputted from the optical fiber 1 is inputted to an optical receiver 24 via the optical multiplexer 21 and an optical switch 23. The optical receiver 22 separates a phase signal c from the optical signal of wavelength 1.31 μm and supplies the phase signal c to a phase controller 25, a phase comparator 26 and an optical transmitter 17. The optical transmitter 27 sends an optical signal of wavelength 1.55 μm modulated by the phase signal c to the optical fiber 1 by way of the optical switch 23 and the optical multiplexer 21. The optical transmitter 24 separates a phase signal d from the optical signal of wavelength 1.55 μm and supplies the phase signal d to the phase comparator 26. The phase comparator 26 supplies phase difference data g indicating the phase difference between phase signal c and phase signal d to the phase controller 25. A data transfer device 29 receives the switch control signal e and the phase difference data f from the data transfer device 19 of the master device transmitting section 10, then delivers the switch control signal e to the control device 28 and deliver the phase difference data f to the phase controller 25. The control device 28 controls the optical switch 23 based on the switch control signal e.

In this case, the optical multiplexers 15, 21 are able to multiplex and separate the optical beams of wavelength 1.31 μm and 1.55 μm. For example, optical fiber coupler type multiplexers, Mach-Zehnder interferometer type multiplexers, or optical multiplexers using diffraction gratings may be used as the optical multiplexers 15 and 21.

The phase comparator 14 of the master device transmitting section 10 compares the phases of the reference phase signal a and the phase signal b to obtain phase difference data f, which is transferred to the phase controller 25 of the slave device receiving section 20 by means of the data transfer devices 19, 29. The phase comparator 26 of the slave device receiving section 20 compares the phases of the phase signal c and the phase signal d to obtain phase difference data g which is supplied to the phase controller 25. As a result, the phase controller 25 of the slave device receiving section 20 adjusts the phase of the phase signal c based on the phase difference data f and g and generates a phase signal a' having the same phase as the reference phase signal a of the master device transmitting section 10. The phase controller 25 can be easily constructed by combining a programmable counter and a phase locked oscillator.

In the present embodiment, the optical transmission lines between the master device transmitting section 10 and the slave device receiving section 20 can be put into the two states shown in FIGS. 2A and 2B by simultaneously switching the optical switch 16 of the master device transmitting section 10 and the optical switch 23 of the slave device transmitting section 20.

In the first state shown in FIG. 2A, the reference phase signal a is transferred from the master device transmitting section 10 to the slave device receiving section 20 with the optical signal of wavelength 1.31 μm, then is returned from the slave device receiving section 20 to the master device transmitting section 10 with the optical signal of wavelength 1.55 μm, whereupon it becomes phase signal b. The phase difference $\Delta_1$ measured at the phase comparator 14 of the master device transmitting section 10 in the first state can be represented as follows:

$$\Delta_1 = T_1 + T_2$$

wherein $T_1$ is the delay time of the optical beam of wavelength 1.31 μm arising in the transfer from the master device transmitting section 10 to the slave device receiving section 20, and $T_2$ is the delay time of the optical beam of wavelength 1.55 μm arising in the transfer from the slave device receiving section 20 to the master device transmitting section 10.

Additionally, in the second state shown in FIG. 2B, the reference phase signal a is simultaneously transferred with the optical beams of wavelength 1.31 μm and 1.55 μm, from the master device transmitting section 10 to the slave device receiving section 20. The transfer delay time in the optical fiber does not depend upon the direction of propagation of optical beams of the same wavelength, so the phase difference $\Delta_2$ measured at the phase comparator 26 of the slave device receiving section 20 in state 2 becomes as follows:

$$\Delta_2 = T_1 - T_2$$

As explained above, the delay time $T_1$ is able to be determined accurately by measuring both phase differences $\Delta_1$ and $\Delta_2$ by switching the optical switches 16, 23, inputting the phase difference data f indicating the phase difference $\Delta_1$ and the phase difference data g indicating the phase difference $\Delta_2$ into the phase controller 25 of the slave device receiving section 20, and performing the following operation:

$$T_1 = (\Delta_1 + \Delta_2)/2$$

The phase controller 25 of the slave device receiving section 20 adjusts the phase of the phase signal c based on the delay time $T_1$ and generates a phase signal a' having the same phase as the reference phase signal a of the master device transmitting section 10.

With the structure of the present embodiment, the wavelength error between the beam outputted from the optical transmitter 13 of the master device transmitting section 10 and the beam outputted from the optical transmitter 27 of the slave device receiving section 20 causes errors in the phase synchronization. However, with optical transmitters which use semiconductor lasers, the precision of wavelength matching can be easily held to less than 1 nm without the use of any special wavelength matching techniques, by controlling the temperature, input electrical current, and selection of semiconductor lasers. Therefore, the phase error due to the wavelength error is sufficiently less than the delay time difference between the optical beam of wavelength 1.31 μm and the optical beam of wavelength 1.55 μm, so that the structure of the present embodiment allows high-precision phase synchronization.

Figure 3:
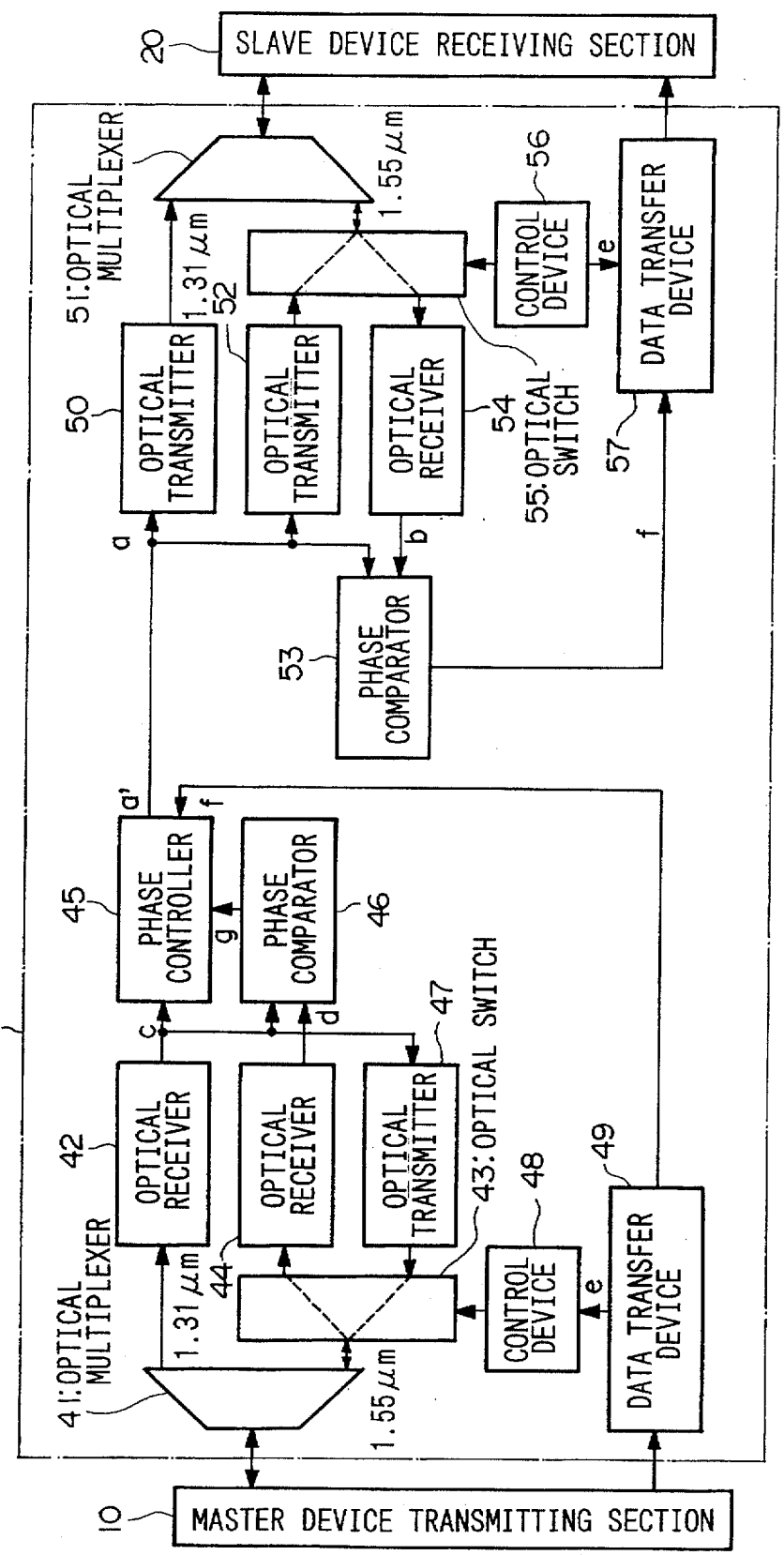
FIG. 3 is a block diagram showing the structure of another example of a phase synchronization system according to the first embodiment of the present invention.

Additionally, FIG. 3 is a block diagram showing the structure of another example of a phase synchronization system according to the first embodiment of the present invention. The master device transmitting section 10 and the slave device receiving section 20 shown in this diagram are identical to those shown in FIG. 1. Additionally, the slave device transmitting/receiving section 40 shown in this diagram is a combination of the slave device receiving section 20 and the master device transmitting section 10 without the reference oscillator 11. At the slave device transmitting/receiving section 40, the phase signal a' determined by the phase controller 45 is inputted to the optical transmitters 50, 52 and the phase comparator 53 as a reference synchronization signal a. While only a single slave device transmitting/receiving section 40 is shown in the phase synchronization system of FIG. 3, a phase synchronization system having a plurality of slave device transmitting/receiving sections 40 may be constructed by connecting them in multiple stages.

[Second Embodiment]

Figure 4:
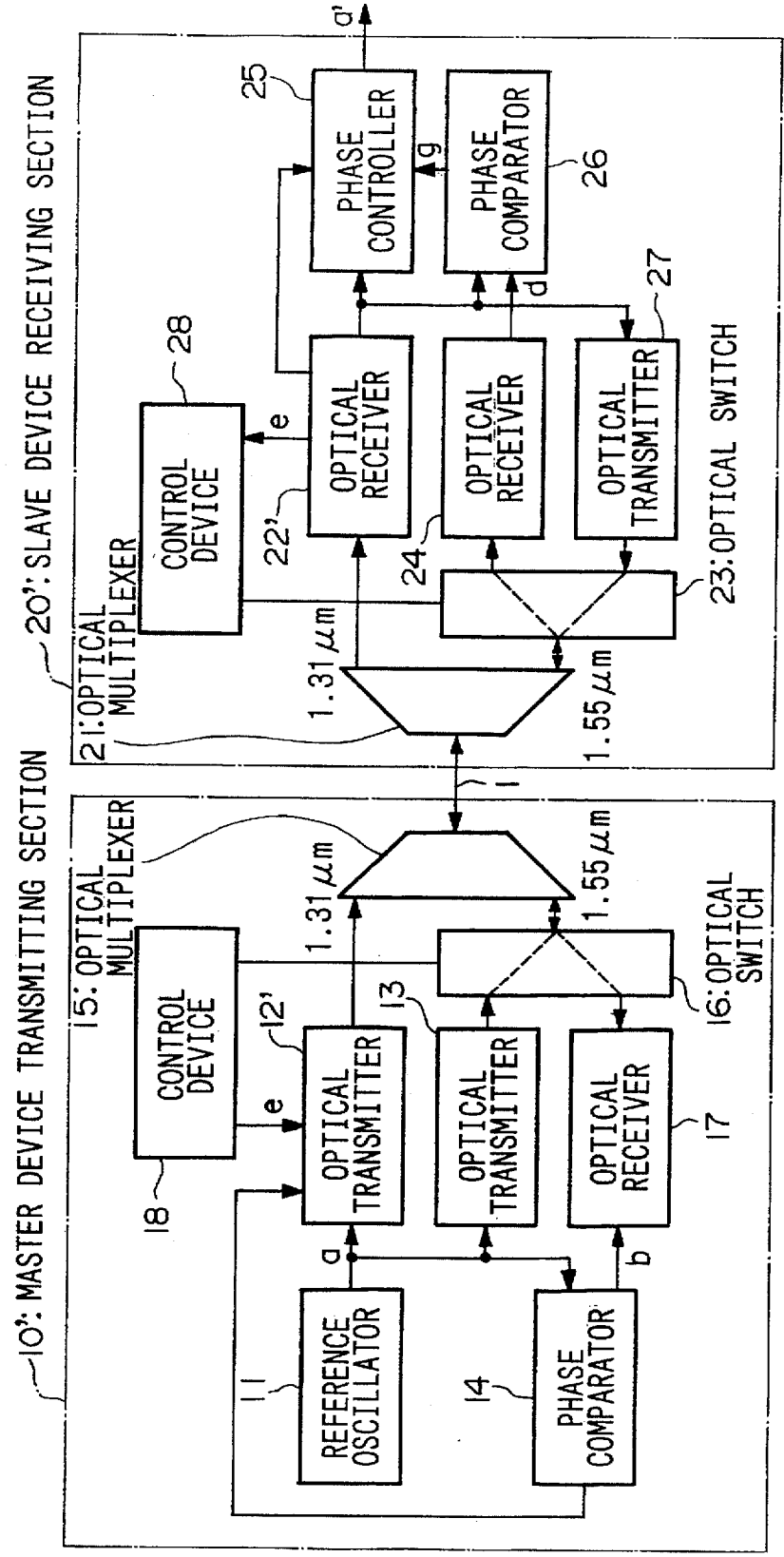
FIG. 4 is a block diagram showing the structure of a phase synchronization system according to the second embodiment of the present invention.

FIG. 4 is a block diagram showing the structure of a phase synchronization system according to the second embodiment of the present invention. The present embodiment is characterized in that the switch control signal e and the phase difference data f mentioned in the first embodiment are transferred by superimposing them on the optical signal of wavelength 1.31 μm. When the optical transmitter 12' of the master device transmitting section 10' sends the reference phase signal a modulated by the optical signal of wavelength 1.31 μm to the optical fiber 1 via the optical multiplexer 15, the switch control signal e and the phase difference data f are sent to the optical fiber 1 by superimposing them onto the optical signal of wavelength 1.31 μm.

Corresponding thereto, the optical receiver 22' of the slave device receiving section 20' has a separation function for extracting the switch control signal e and the phase difference data f from the optical signal of wavelength 1.31 μm. As a result, the switch control signal e and the phase difference data f are able to be transferred by using the optical fiber 1, so that the data transfer devices 19, 29 and the transfer lines between the data transfer devices as indicated in the first embodiment are unnecessary.

In the present embodiment, the reference phase signal and the phase difference are superimposed onto the optical signal and sent in the following manner. The optical signals normally used in telecommunications have a frame structure with a constant period (for example, a period of 125 μs). The reference phase signal and the phase difference data can be transmitted with such an optical signal by giving the header bit of the frame the reference phase and putting the phase difference data in the data area.

Even better results can be obtained is SDH (synchronous digital hierarchy) signals, which is an internationally accepted standard format for communications signals, are used. That is, SDH signals have areas (called section overhead) which are independent of the main signal channel.

The phase difference data can be carried in these areas so that the reference phase signal and the phase difference data can be transmitted without interfering with the main signal. In this way, the SDH main signal and the phase synchronization signal are able to be sent simultaneously, which is an advantage from the standpoint of economics.

Figure 5:
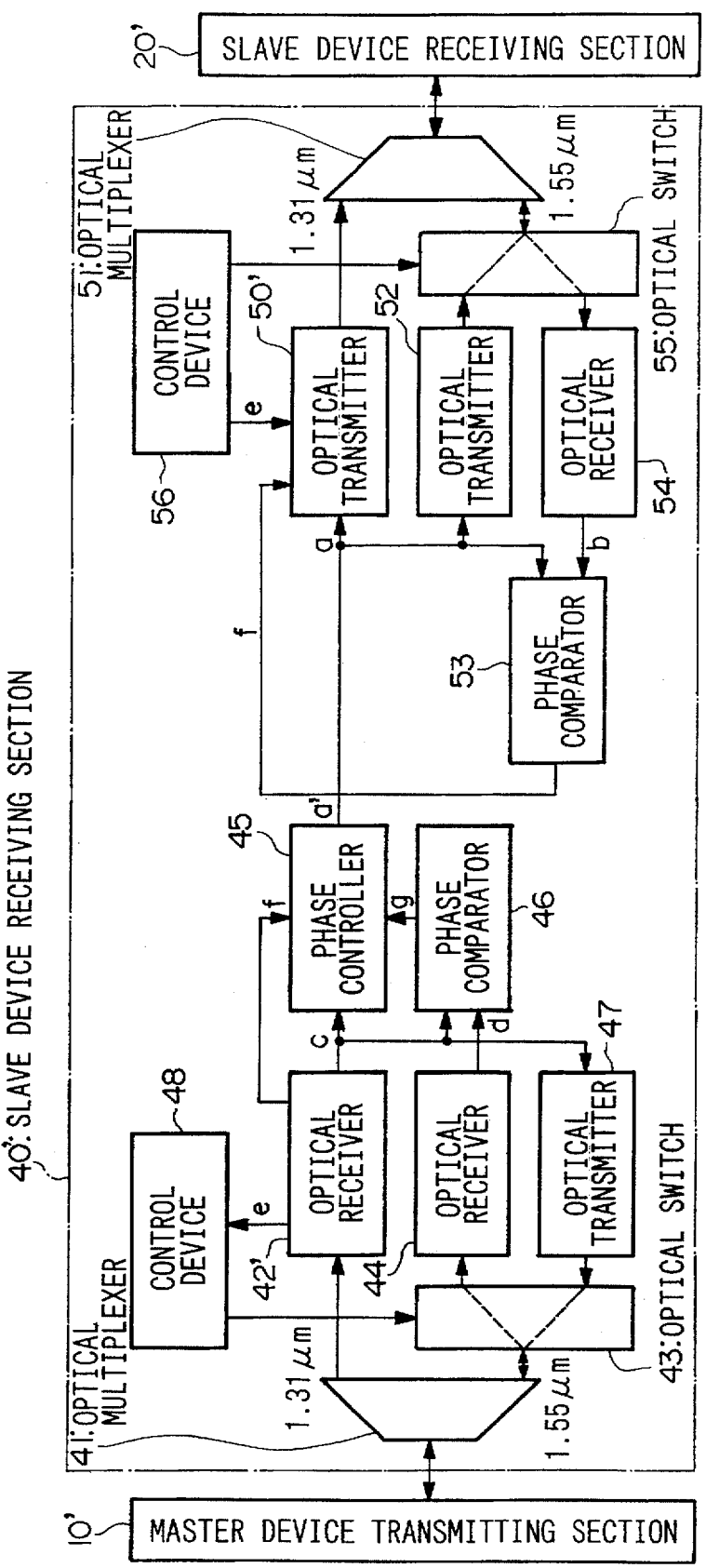
FIG. 5 is a block diagram showing the structure of another example of a phase synchronization system according to the second embodiment of the present invention.

FIG. 5 is a block diagram showing the structure of another example of a phase synchronization system according to the second embodiment of the present invention. The master device transmitting section 10' and the slave device receiving section 20' shown in this diagram are identical to those shown in FIG. 4. Additionally, the slave device transmitting/receiving section 40' is a combination of the slave device receiving section 20' and the master device transmitting section 10' without the reference oscillator 11. At the slave device transmitting/receiving section 40', the phase signal a' determined by the phase controller 45 is inputted to the optical transmitters 50', 52 and the phase comparator 53 as a reference phase signal a. While the phase synchronization system shown in FIG. 5 has only a single slave device transmitting/receiving section 40', a phase synchronization system having a plurality of slave transmitting/receiving sections 40' can be constructed by connecting them in multiple stages.

[Third Embodiment]

Figure 6:
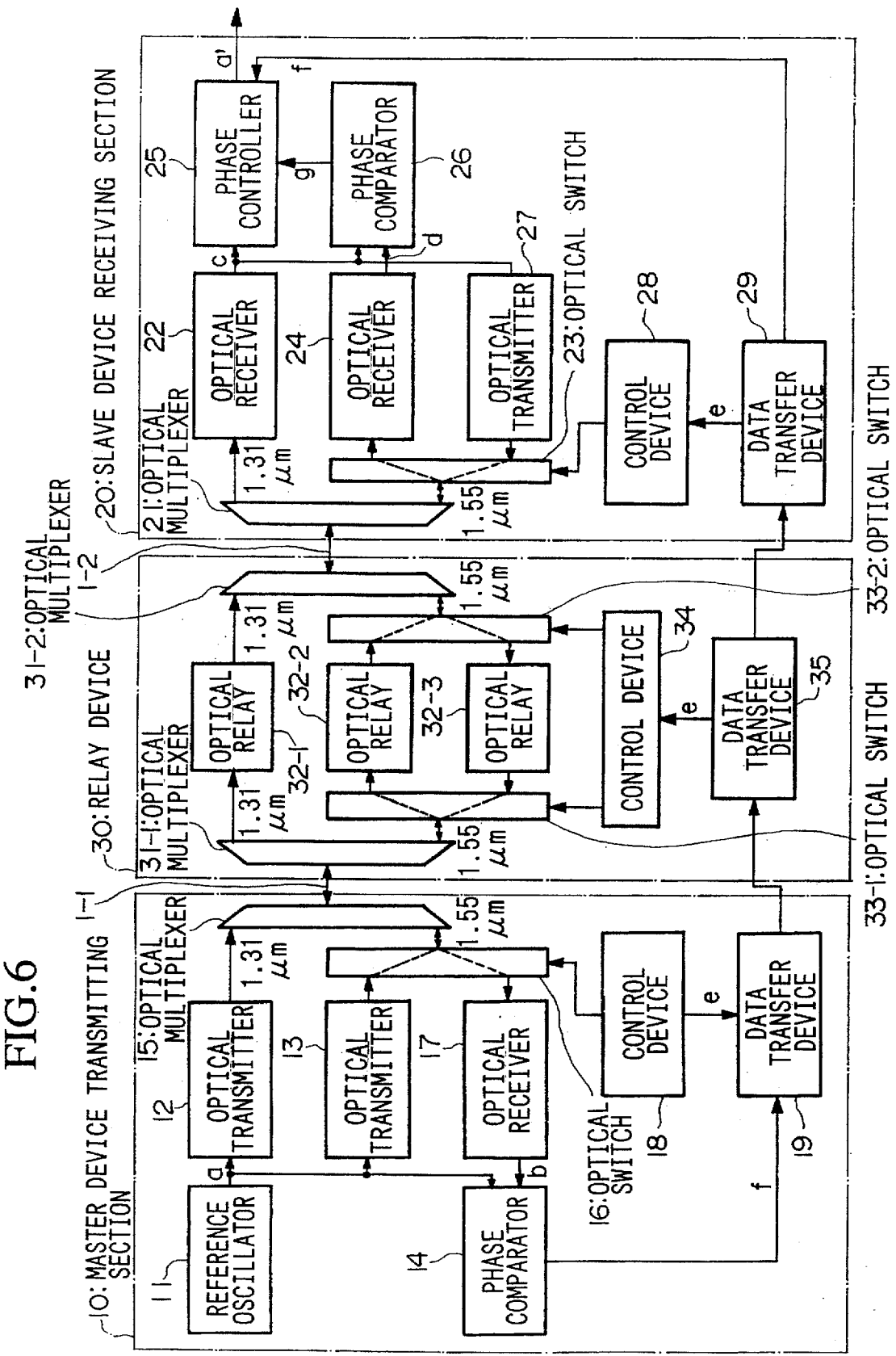
FIG. 6 is a block diagram showing the structure of a phase synchronization system according to the third embodiment of the present invention.

FIG. 6 is a block diagram showing the structure of a phase synchronization system according to the third embodiment of the present invention. The master device transmitting section 10 and the slave device receiving section 20 shown in this diagram are identical to those in FIG. 1. The master device transmitting section 10 is connected to a relay device 30 by means of an optical fiber 1-1, and the relay device 30 is connected to the slave device receiving section 20 by means of the optical fiber 1-2.

At the relay device 30, an optical signal of wavelength 1.31 µm inputted from the optical fiber 1-1 is sent to the optical fiber 1-2 via the optical multiplexer 31-1, the optical relay 32-1, and the optical multiplexer 31-2. Additionally, an optical signal of wavelength 1.55 µm inputted from the optical fiber 1-1 is sent to the optical fiber 1-2 via the optical multiplexer 31-1, the optical switch 33-1, the optical relay 32-1, the optical switch 33-2, and the optical multiplexer 31-2. Furthermore, an optical signal of wavelength 1.55 µm inputted from the optical fiber 1-2 is sent to the optical fiber 1-1 via the optical multiplexer 31-2, the optical switch 33-2, the optical relay 32-3, the optical switch 33-1, and the optical multiplexer 31-1. A data transfer device 35 receives a switch control signal e and phase difference data f from the data transfer device 19 of the master device transmitting section 10, inputs the switch control signal e to the control device 34, and sends the switch control signal e and the phase difference data f to the slave device receiving section 20. The control device 34 simultaneously switches the optical switches 33-1, 33-2 based on the switch control signal e.

The phase comparator 14 of the master device transmitting section 10 compares the phase between the reference phase signal a and the phase signal b to obtain phase difference data f, which is transferred to the phase controller 25 of the slave device receiving section 20 by means of the data transfer devices 19, 35 and 29. The phase comparator 26 of the slave device receiving section 20 compares the phase between the phase signal c and the phase signal d to obtain phase difference data g, which is supplied to the phase controller 25. As a result, the phase controller 25 of the slave device receiving section 20 adjusts the phase of the phase signal c based on the phase difference data f and g, and generates a phase signal a' having the same phase as the reference phase signal a of the master device transmitting section 10. The phase controller 25 can be easily formed by combining a programmable counter with a phase locked oscillator.

In the present embodiment, the optical transmission line between the master device transmitting section 10 and the slave device receiving section can be put into two different states as in the first embodiment, by simultaneously switching the optical switch 16 of the master device transmitting section, the optical switches 33-1, 33-2 of the relay device 30, and the optical switch 23 of the slave device receiving section.

In the first state, the reference phase signal a is transferred from the master device transmitting section 10 through the relay device 30 to the slave device receiving section 20 with the optical signal of wavelength 1.31 µm, then is returned from the slave device receiving section 20 through the relay device 30 to the master device transmitting section 10 with the optical signal of wavelength 1.55 µm, whereupon it becomes phase signal b. The phase difference $\Delta_1$ measured at the phase comparator 14 of the master device transmitting section 10 in the first state can be represented as follows:

$$\Delta_1 = T_1 + T_2$$

wherein $T_1$ is the delay time of the optical beam of wavelength 1.31 µm arising in the transfer from the master device transmitting section 10 to the slave device receiving section 20, and $T_2$ is the delay time of the optical beam of wavelength 1.55 µm arising in the transfer from the slave device receiving section 20 to the master device transmitting section 10.

Additionally, in the second state shown, the reference phase signal a is simultaneously transferred with the optical beams of wavelength 1.31 µm and 1.55 µm, from the master device transmitting section 10 through the relay device 30 to the slave device receiving section 20. The transfer delay time in the optical fiber does not depend upon the direction of propagation of optical beams of the same wavelength, so the phase difference $\Delta_2$ measured at the phase comparator 26 of the slave device receiving section 20 in state 2 becomes as follows:

$$\Delta_2 = T_1 - T_2$$

As explained above, the delay time $T_1$ is able to be determined accurately by measuring both phase differences $\Delta_1$ and $\Delta_2$ by switching the optical switches 16, 33-1, 33-2 and 23, inputting the phase difference data f indicating the phase difference $\Delta_1$ and the phase difference data g indicating the phase difference $\Delta_2$ into the phase controller 25 of the slave device receiving section 20, and performing the following operation:

$$T_1 = (\Delta_1 + \Delta_2)/2$$

The phase controller 25 of the slave device receiving section 20 adjusts the phase of the phase signal c based on the delay time $T_1$ and generates a phase signal a' having the same phase as the reference phase signal a of the master device transmitting section 10.

While an example wherein the master device transmitting section 10 and the slave device receiving section 20 are connected by way of a single relay device 30 was used to explain the present embodiment, it is possible to obtain a similar high-precision phase synchronization even if there are two or more relay devices 30 due to the length of the distance between the master device transmitting section 10 and the slave device receiving section 20.

Additionally, while an example wherein a relay device 30 is provided in a phase synchronization system comprising a master device transmitting section 10 and a slave device receiving section 20 was used to explain the present embodiment, a relay device may also be used in a phase synchronization system comprising a master device transmitting section 10, a slave device receiving section 20 and a slave device transmitting/receiving section 40 as shown in FIG. 3.

[Fourth Embodiment]

Figure 7:
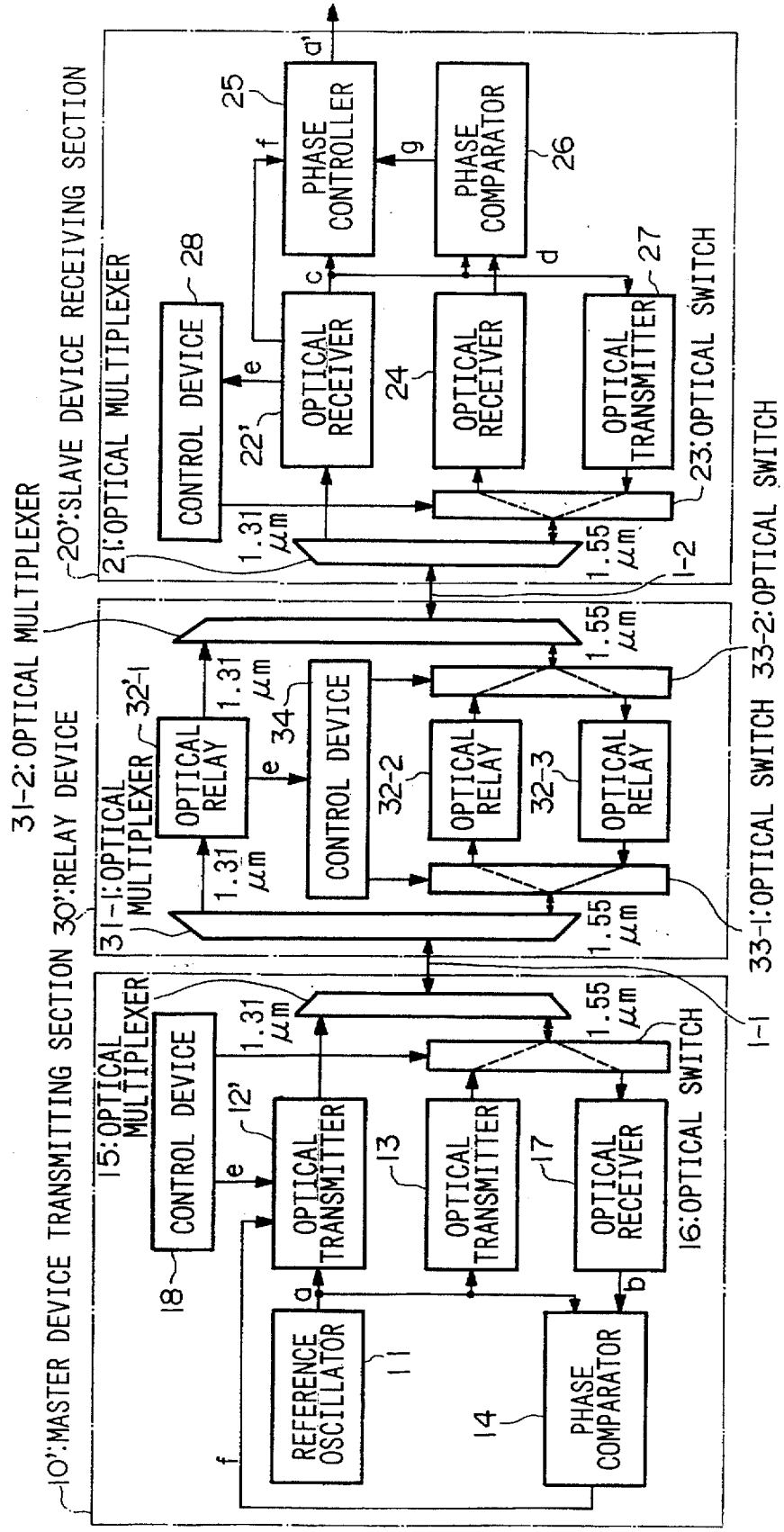
FIG. 7 is a block diagram showing the structure of a phase synchronization system according to the fourth embodiment of the present invention.

FIG. 7 is a block diagram showing the structure of a phase synchronization system according to the fourth embodiment of the present invention. The master device transmitting section 10' and the slave device receiving section 20' shown in the diagram are identical to those shown in FIG. 4. When the optical transmitter 12' of the master device transmitting section 10' sends the reference phase signal a modulated by the optical signal of wavelength 1.31 μm to the optical fiber 1 via the optical multiplexer 15, the switch control signal e and the phase difference data f are sent to the optical fiber 1 by superimposing them onto the optical signal of wavelength 1.31 μm.

Corresponding thereto, the optical relay 32-1' of the relay device 30' has a separation function for extracting the switch control signal e from the optical signal of wavelength 1.31 μm. Additionally, the optical receiver 22' of the slave device receiving section 20' has a separation function for extracting the switch control signal e and the phase difference data f from the optical signal of wavelength 1.31 μm. As a result, the switch control signal e and the phase difference data f are able to be transferred by using the optical fibers 1-1 and 1-2, so that the data transfer devices 19, 29, 35 and the transfer lines between the data transfer devices as indicated in the third embodiment are unnecessary.

While an example wherein a relay device 30' is provided in a phase synchronization system comprising a master device transmitting section 10' and a slave device receiving section 20' was used to explain the present embodiment, a relay device may also be used in a phase synchronization system comprising a master device transmitting section 10', a slave device receiving section 20' and a slave device transmitting/receiving section 40' as shown in FIG. 5.

Additionally, optical beams of two different wavelengths in the 1.5 μm band, such as 1.54 μm and 1.56 μm, may be used in any of the above-described embodiments. In this case, the structure of the fifth embodiment explained below can be used.

[Fifth Embodiment]

Figure 8:
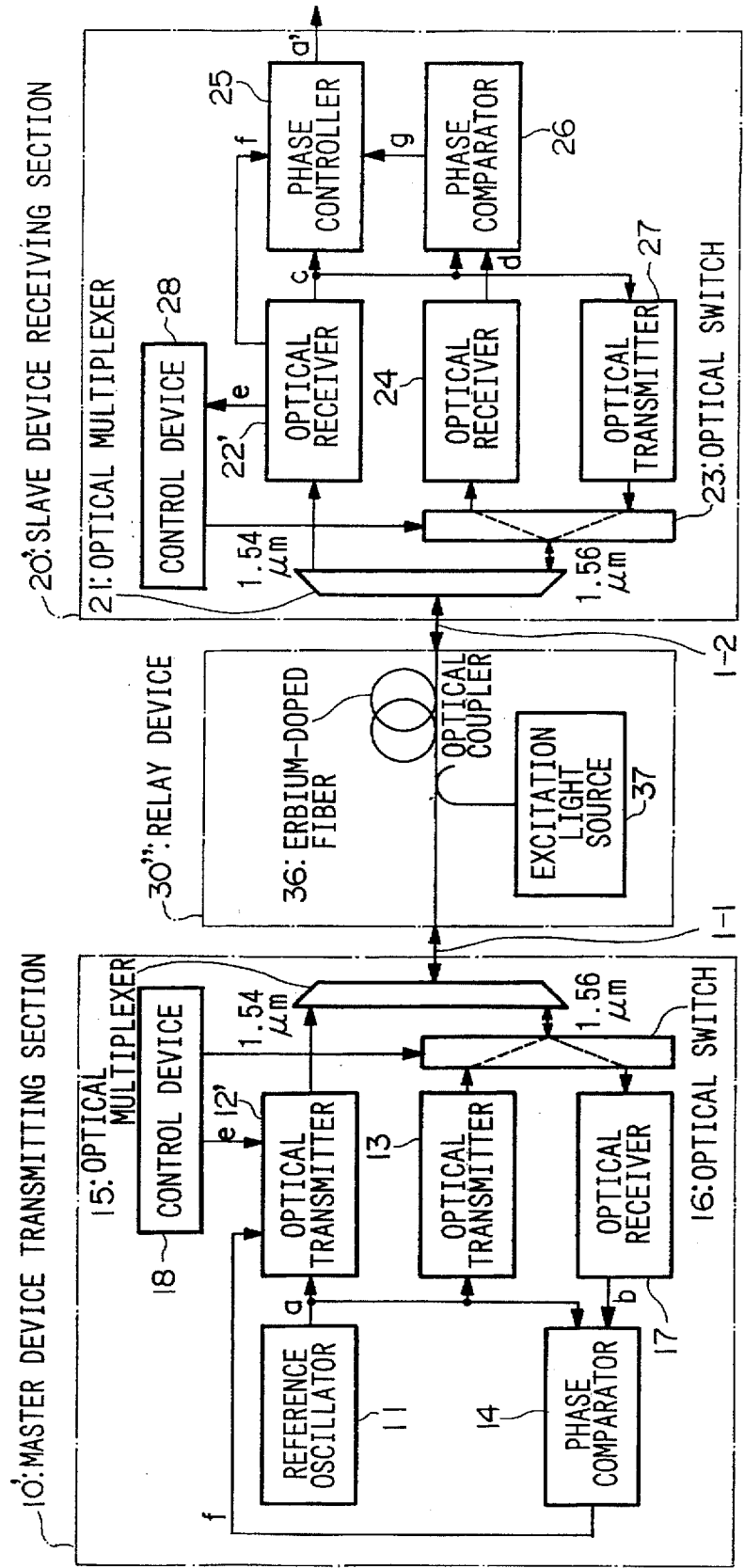
FIG. 8 is a block diagram showing the structure of a phase synchronization system according to the fifth embodiment of the present invention.

FIG. 8 is a block diagram showing the structure of a phase synchronization system according to the fifth embodiment of the present invention.

A feature of the present embodiment is that an optical fiber amp, comprising an erbium-doped fiber 36, an excitation light source 37, and an optical coupler 38 for inputting an excitation beam emitted from the excitation light source 37 into the erbium-doped fiber 36, is used as a relay device 30" as shown in FIG. 8. Optical beams of wavelength 1.54 μm and 1.56 μm, which are able to be amplified by the erbium-doped fiber 36, are used as the optical signals.

An optical transmitter 12' of the master device transmitting section 10' sends optical signals of wavelength 1.54 μm, an optical transmitter 13 of the master device transmitting section 10' sends optical signals of wavelength 1.56 μm, and an optical receiver 17 of the master device transmitting section 10' receives optical signals of wavelength 1.56 μm. On the other hand, an optical receiver 22' of the slave device receiving section 20' receives optical signals of wavelength 1.54 μm, an optical receiver 24 of the slave device receiving section 20' receives optical signals of wavelength 1.56 μm, and optical transmitter 27 of the slave device receiving section 20' sends optical signals of wavelength 1.56 μm. Regardless of the direction of propagation of the optical signals of wavelength 1.54 μm and 1.56 μm, the optical signals are amplified in the relay device 30", so that there is no need for optical multiplexers or optical switches in the relay device 30".

Figure 9:
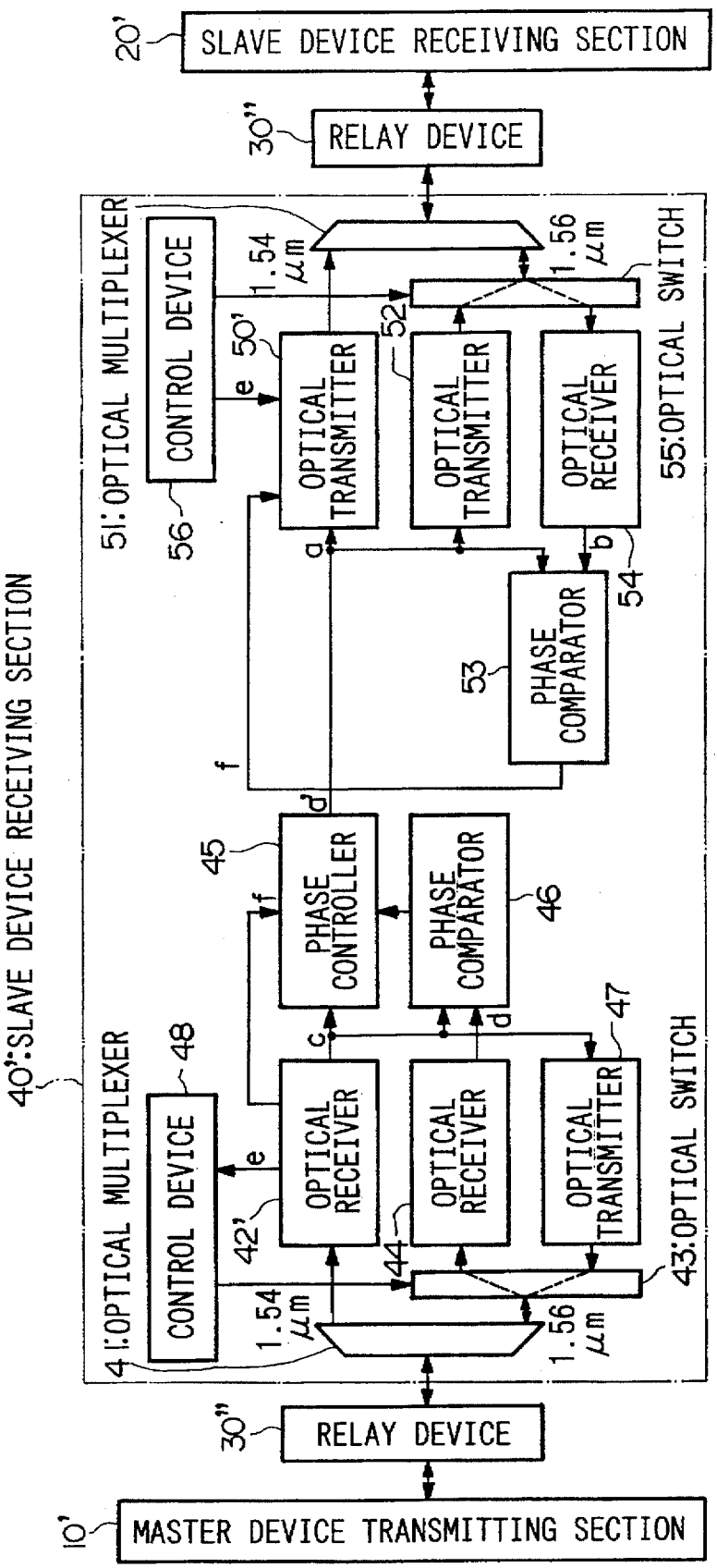
FIG. 9 is a block diagram showing the structure of another example of a phase synchronization system according to the fifth embodiment of the present invention.
Figure 10:
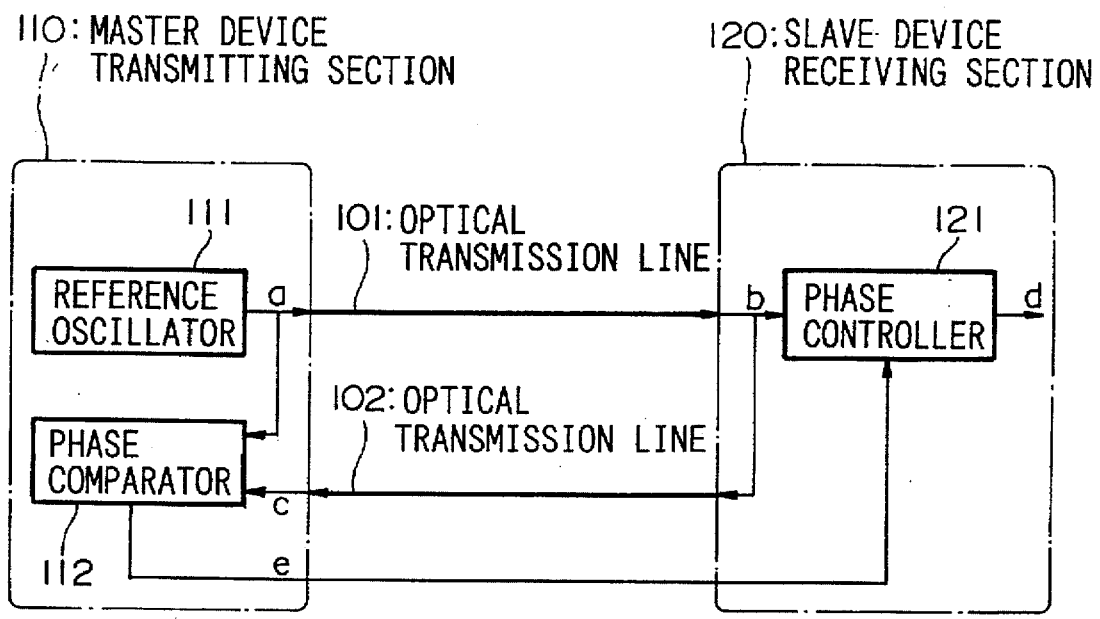
FIG. 10 is a block diagram showing the structure of a conventional phase synchronization system.
Figure 11:
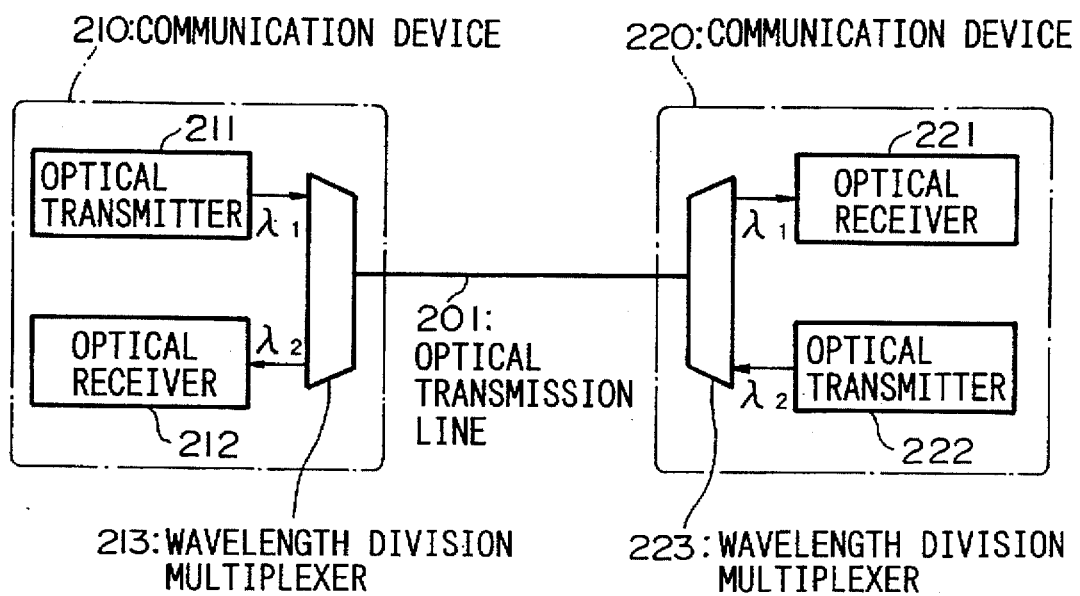
FIG. 11 is a block diagram showing the structure of a wavelength division multiplexing bi-directional communications system.

FIG. 9 is a block diagram showing the structure of another example of a phase synchronization system according to the fifth embodiment of the present invention. The master device transmitting section 10', the relay device 30", and the slave device receiving section 20' shown in the diagram are identical to those shown in FIG. 8. Additionally, the slave device transmitting/receiving section 40' is a combination of the master device transmitting section 10' and the slave device receiving section 20' without the reference oscillator 11. At the slave device transmitting/receiving section 40', a phase signal a' determined by the phase controller 45 is inputted to the optical transmitters 50', 52 and the phase comparator 53 as a reference synchronization signal a. While the phase synchronization system shown in FIG. 9 has only a single slave device transmitting/receiving section 40', a phase synchronization system having a plurality of slave device transmitting/receiving section 40' may be constructed by connecting them in multiple stages.

[Supplemental Explanation]

While embodiments of the present invention have been described above with reference to the drawings, the detailed structure need not be restricted to these particular embodiments, and the scope of the present invention encompasses any design modifications as ling as they do not conflict with the gist of the present invention. The present invention may also be used in systems which do not use optical fiber transmission lines and optical signals. For example, the present invention may be applied to systems for performing phase synchronization using optical signals which propagate through free space, or to systems wherein electromagnetic waves are sent through the ionosphere to perform phase synchronization between artificial satellites and ground-based equipment.

We claim:

1. A receiving device for a phase synchronization system, comprising:

an optical multiplexer for receiving optical signals from an optical fiber connected to a transmitting device provided in a master or slave device, and separating said optical signals into optical signals of a first wavelength $\lambda_1$ and optical signals of a second wavelength $\lambda_2$;

a first optical receiver for separating first phase signals from said optical signals of wavelength $\lambda_1$;

a second optical receiver for separating second phase signals from said optical signals of wavelength $\lambda_2$;

a phase comparator for determining a phase difference between said first phase signals and said second phase signals, by determining a difference between a first delay time for said optical signals of wavelength $\lambda_1$ to travel from said transmitting device to the present device and a second delay time for said optical signals of wavelength $\lambda_2$ to travel from said transmitting device to the present device, and outputting second phase difference data indicating said phase difference;

an optical transmitter for generating optical signals of wavelength $\lambda_2$ modulated by said first phase signals, and sending said optical signals through said optical multiplexer to said optical fiber;

an optical switch for switching between a first state wherein optical signals of wavelength $\lambda_2$ generated by said optical transmitter are inputted into said optical multiplexer and a second state wherein optical signals of wavelength $\lambda_2$ separated by said optical multiplexer are inputted into said second optical receiver;

a data transfer section for receiving switch control signals for switching between the states of said optical switch and first phase difference data indicating the sum of said first delay time and said second delay time;

a control section for controlling the state of said optical switch based on said switch control signals received by said data transfer section;

a delay time calculation section for determining a first delay time by adding the values of said first phase difference data and said second phase difference data, and dividing the resulting sum by 2; and a phase control section for generating phase signals synchronized with reference phase signals generated by said transmitting device by adjusting the phase of said first phase signals based on said first delay time determined by said delay time calculation section.

2. A transmitting device for a phase synchronization system, comprising:

a reference oscillator for generating reference phase signals;

a first optical transmitter for generating optical signals of a first wavelength $\lambda_1$ modulated by the reference signals generated by said reference oscillator;

a second optical transmitter for generating optical signals of a second wavelength $\lambda_2$ modulated by the reference signals generated by said reference oscillator;

an optical multiplexer for combining the optical signals of wavelength $\lambda_1$ generated by said first optical transmitter and the optical signals of wavelength $\lambda_2$ generated by said second optical transmitter, sending the combined optical signals to an optical fiber connected to a receiving device provided in a slave device, receiving optical signals from said optical fiber, and separating optical signals of wavelength $\lambda_2$ from the received optical signals;

an optical receiver for separating phase signals from said optical signals of wavelength $\lambda_2$ separated by said optical multiplexer;

a phase comparator for determining a phase difference between said reference phase signals and said separated phase signals, by determining the sum of a first delay time for said optical signals of wavelength $\lambda_1$ to travel from the present device to said receiving device and a second delay time for said optical signals of wavelength $\lambda_2$ to travel from said receiving device to the present device, and outputting first phase difference data indicating said phase difference;

an optical switch for switching between a first state wherein optical signals of wavelength $\lambda_2$ separated by said optical multiplexer are inputted into said optical receiver and a second state wherein optical signals of wavelength $\lambda_2$ generated by said second optical transmitter are inputted into said optical multiplexer;

a control section for controlling the state of said optical switch and outputting switch control signals indicating the control state; and a data transfer section for sending out said switch control signals outputted by said control section and said first phase difference data outputted by said phase comparator.

3. A transmitting device for a phase synchronization system according to claim 2, wherein the reference phase signals generated by said reference oscillator are reference phase signals from an external source.

4. A receiving device for a phase synchronization system according to claim 1, wherein said data transfer section separates said first phase difference data and said switch control signals, which have been superimposed onto said optical signals of wavelength $\lambda_1$, from said optical signals of wavelength $\lambda_1$.

5. A transmitting device for a phase synchronization system according to claim 2, wherein said data transfer section superimposes said first phase difference data and said switch control signals onto said optical signals of wavelength $\lambda_1$.

6. A transmitting device for a phase synchronization system according to claim 3, wherein said data transfer section superimposes said first phase difference data and said switch control signals onto said optical signals of wavelength $\lambda_1$.

7. A transmitting/receiving device for a phase synchronization system, comprising:

a receiving device, connected to an optical fiber, comprising a first optical multiplexer for receiving optical signals from the optical fiber connected to an external transmitting device provided in a master or slave device, and separating said optical signals into optical signals of a first wavelength $\lambda_1$ and optical signals of a second wavelength $\lambda_2$, a first optical receiver for separating first phase signals from said optical signals of wavelength $\lambda_1$, a second optical receiver for separating second phase signals from said optical signals of wavelength $\lambda_2$, a first phase comparator for determining a phase difference between said first phase signals and said second phase signals by determining a difference between a first delay time for said optical signals of wavelength $\lambda_1$ to travel from said external transmitting device to the receiving device and a second delay time for said optical signals of wavelength $\lambda_2$ to travel from said external transmitting device to the receiving device, and outputting second phase difference data indicating said phase difference, a first optical transmitter for generating optical signals of wavelength $\lambda_2$ modulated by said first phase signals, and sending said optical signals through said first optical multiplexer to said optical fiber, a first optical switch for switching between a first state wherein optical signals of wavelength $\lambda_2$ generated by said first optical transmitter are inputted into said first optical multiplexer and a second state wherein optical signals of wavelength $\lambda_2$ separated by said first optical multiplexer are inputted into said second optical receiver, a first data transfer section for receiving switch control signals for switching between the states of said first optical switch and first phase difference data indicating a sum of said first delay time and said second delay time.

a first control section for controlling the state of said first optical switch based on said switch control signals received by said first data transfer section, a delay time calculation section for determining a first delay time by adding values of said first phase difference data and said second phase difference data, and dividing a resulting sum by 2, and a phase control section for generating phase signals synchronized with reference phase signals generated by said external transmitting device by adjusting the phase of said first phase signals based on said first delay time determined by said delay time calculation section; and a transmitting device, connected to the optical fiber, comprising a reference oscillator for generating reference phase signals from the phase signals generated by the phase control section, a second optical transmitter for generating optical signals of the first wavelength $\lambda_1$ modulated by the reference signals generated by said reference oscillator, a third optical transmitter for generating optical signals of the second wavelength $\lambda_2$ modulated by the reference signals generated by said reference oscillator, a second optical multiplexer for combining the optical signals of wavelength $\lambda_1$ generated by said second optical transmitter and the optical signals of wavelength $\lambda_2$ generated by said third optical transmitter, sending the combined optical signals to the optical fiber connected to an external receiving device provided in a slave device, receiving optical signals from said optical fiber, and separating optical signals of wavelength $\lambda_2$ from the received optical signals, a third optical receiver for separating phase signals from said optical signals of wavelength $\lambda_2$ separated by said second optical multiplexer, a second phase comparator for determining a phase difference between said reference phase signals and said separated phase signals by determining a sum of a first delay time for said optical signals of wavelength $\lambda_1$ to travel from the transmitting device to said external receiving device and a second delay time for said optical signals of wavelength $\lambda_2$ to travel from said external receiving device to the transmitting device, and outputting first phase difference data indicating said phase difference, a second optical switch for switching between a first state wherein optical signals of wavelength $\lambda_2$ separated by said second optical multiplexer are inputted into said third optical receiver and a second state wherein optical signals of wavelength $\lambda_2$ generated by said third optical transmitter are inputted into said second optical multiplexer, a second control section for controlling the state of said second optical switch and outputting switch control signals indicating the control state, and a second data transfer section for sending out said switch control signals outputted by said second control section and said first phase difference data outputted by said second phase comparator.

8. A transmitting/receiving device for a phase synchronization system, comprising:

a receiving device, connected to an optical fiber, comprising a first optical multiplexer for receiving optical signals from the optical fiber connected to an external transmitting device provided in a master or slave device, and separating said optical signals into optical signals of a first wavelength $\lambda_1$ and optical signals of a second wavelength $\lambda_2$, a first optical receiver for separating first phase signals from said optical signals of wavelength $\lambda_1$, a second optical receiver for separating second phase signals from said optical signals of wavelength $\lambda_2$, a first phase comparator for determining a phase difference between said first phase signals and said second phase signals by determining a difference between a first delay time for said optical signals of wavelength $\lambda_1$ to travel from said external transmitting device to the receiving device and a second delay time for said optical signals of wavelength $\lambda_2$ to travel from said external transmitting device to the receiving device, and outputting second phase difference data indicating said phase difference, a first optical transmitter for generating optical signals of wavelength $\lambda_2$ modulated by said first phase signals, and sending said optical signals through said first optical multiplexer to said optical fiber, a first optical switch for switching between a first state wherein optical signals of wavelength $\lambda_2$ generated by said first optical transmitter are inputted into said first optical multiplexer and a second state wherein optical signals of wavelength $\lambda_2$ separated by said first optical multiplexer are inputted into said second optical receiver, a first data transfer section for receiving switch control signals for switching between the states of said first optical switch and first phase difference data indicating a sum of said first delay time and said second delay time, and for separating the first phase difference data and the switch control signals, which have been superimposed onto the optical signals of wavelength $\lambda_1$ by the external transmitting device, from said optical signals of wavelength $\lambda_1$, a first control section for controlling the state of said first optical switch based on said switch control signals received by said first data transfer section, a delay time calculation section for determining a first delay time by adding values of said first phase difference data and said second phase difference data, and dividing a resulting sum by 2, and a phase control section for generating phase signals synchronized with reference phase signals generated by said external transmitting device by adjusting the phase of said first phase signals based on said first delay time determined by said delay time calculation section; and a transmitting device, connected to the optical fiber, comprising a reference oscillator for generating reference phase signals from the phase signals generated by the phase control section, a second optical transmitter for generating optical signals of the first wavelength $\lambda_1$ modulated by the reference signals generated by said reference oscillator, a third optical transmitter for generating optical signals of the second wavelength $\lambda_2$ modulated by the reference signals generated by said reference oscillator, a second optical multiplexer for combining the optical signals of wavelength $\lambda_1$ generated by said second optical transmitter and the optical signals of wavelength $\lambda_2$ generated by said third optical transmitter, sending the combined optical signals to the optical fiber connected to an external receiving device provided in a slave device, receiving optical signals from said optical fiber, and separating optical signals of wavelength $\lambda_2$ from the received optical signals, a third optical receiver for separating phase signals from said optical signals of wavelength $\lambda_2$ separated by said second optical multiplexer, a second phase comparator for determining a phase difference between said reference phase signals and said separated phase signals by determining a sum of a first delay time for said optical signals of wavelength $\lambda_1$ to travel from the transmitting device to said external receiving device and a second delay time for said optical signals of wavelength $\lambda_2$ to travel from said external receiving device to the transmitting device, and outputting first phase difference data indicating said phase difference, a second optical switch for switching between a first state wherein optical signals of wavelength $\lambda_2$ separated by said second optical multiplexer are inputted into said third optical receiver and a second state wherein optical signals of wavelength $\lambda_2$ generated by said third optical transmitter are inputted into said second optical multiplexer, a second control section for controlling the state of said second optical switch and outputting switch control signals indicating the control state, and a second data transfer section for sending out said switch control signals outputted by said second control section and said first phase difference data outputted by said second phase comparator, said second data transfer section superimposing said first phase difference data and said switch control signals onto said optical signals of wavelength $\lambda_1$.

9. A phase synchronization system, comprising:

a receiving device, connected to an optical fiber, comprising a first optical multiplexer for receiving optical signals from the optical fiber connected to a transmitting device provided in a master or slave device, and separating said optical signals into optical signals of a first wavelength $\lambda_1$ and optical signals of a second wavelength $\lambda_2$, a first optical receiver for separating first phase signals from said optical signals of wavelength $\lambda_1$, a second optical receiver for separating second phase signals from said optical signals of wavelength $\lambda_2$, a first phase comparator for determining a phase difference between said first phase signals and said second phase signals by determining a difference between a first delay time for said optical signals of wavelength $\lambda_1$ to travel from said transmitting device to the receiving device and a second delay time for said optical signals of wavelength $\lambda_2$ to travel from said transmitting device to the receiving device, and outputting second phase difference data indicating said phase difference, a first optical transmitter for generating optical signals of wavelength $\lambda_2$ modulated by said first phase signals, and sending said optical signals through said first optical multiplexer to said optical fiber, a first optical switch for switching between a first state wherein optical signals of wavelength $\lambda_2$ generated by said first optical transmitter are inputted into said first optical multiplexer and a second state wherein optical signals of wavelength $\lambda_2$ separated by said first optical multiplexer are inputted into said second optical receiver, a first data transfer section for receiving switch control signals for switching between the states of said first optical switch and first phase difference data indicating a sum of said first delay time and said second delay time, a first control section for controlling the state of said first optical switch based on said switch control signals received by said first data transfer section, a delay time calculation section for determining a first delay time by adding values of said first phase difference data and said second phase difference data, and dividing a resulting sum by 2, and a phase control section for generating phase signals synchronized with reference phase signals generated by said transmitting device by adjusting the phase of said first phase signals based on said first delay time determined by said delay time calculation section; and said transmitting device, connected to the receiving device via the optical fiber, comprising a reference oscillator for generating reference phase signals, a second optical transmitter for generating optical signals of the first wavelength $\lambda_1$ modulated by the reference signals generated by said reference oscillator, a third optical transmitter for generating optical signals of the second wavelength $\lambda_2$ modulated by the reference signals generated by said reference oscillator, a second optical multiplexer for combining the optical signals of wavelength $\lambda_1$ generated by said second optical transmitter and the optical signals of wavelength $\lambda_2$ generated by said third optical transmitter, sending the combined optical signals to the optical fiber connected to said receiving device provided in a slave device, receiving optical signals from said optical fiber, and separating optical signals of wavelength $\lambda_2$ from the received optical signals, a third optical receiver for separating phase signals form said optical signals of wavelength $\lambda_2$ separated by said second optical multiplexer, a second phase comparator for determining a phase difference between said reference phase signals and said separated phase signals by determining a sum of a first delay time for said optical signals of wavelength $\lambda_1$ to travel from the transmitting device to said receiving device and a second delay time for said optical signals of wavelength $\lambda_2$ to travel from said receiving device to the transmitting device and outputting first phase difference data indicating said phase difference, a second optical switch for switching between a first state wherein optical signals of wavelength $\lambda_2$ separated by said second optical multiplexer are inputted into said third optical receiver and a second state wherein optical signals of wavelength $\lambda_2$ generated by said third optical transmitter are inputted into said second optical multiplexer, a second control section for controlling the state of said second optical switch and outputting switch control signals indicating the control state, and a second data transfer section for sending out said switch control signals outputted by said second control section and said first phase difference data outputted by said second phase comparator.

10. A phase synchronization system, comprising:

a receiving device, connected to an optical fiber, comprising a first optical multiplexer for receiving optical signals from the optical fiber connected to a transmitting device provided in a master or slave device, and separating said optical signals into optical signals of a first wavelength $\lambda_1$ and optical signals of a second wavelength $\lambda_2$, a first optical receiver for separating first phase signals from said optical signals of wavelength $\lambda_1$, a second optical receiver for separating second phase signals from said optical signals of wavelength $\lambda_2$, a first phase comparator for determining a phase difference between said first phase signals and said second phase signals by determining a difference between a first delay time for said optical signals of wavelength $\lambda_1$ to travel from said transmitting device to the receiving device and a second delay time for said optical signals of wavelength $\lambda_2$ to travel from said transmitting device to the receiving device, and outputting second phase difference data indicating said phase difference, a first optical transmitter for generating optical signals of wavelength $\lambda_2$ modulated by said first phase signals, and sending said optical signals through said first optical multiplexer to said optical fiber, a first optical switch for switching between a first state wherein optical signals of wavelength $\lambda_2$ generated by said first optical transmitter are inputted into said first optical multiplexer and a second state wherein optical signals of wavelength $\lambda_2$ separated by said first optical multiplexer are inputted into said second optical receiver, a first data transfer section for receiving switch control signals for switching between the states of said first optical switch and first phase difference data indicating a sum of said first delay time and said second delay time, and for separating said first phase difference data and said switch control signals, which have been superimposed onto said optical signals of wavelength $\lambda_1$ by said transmitting device, from said optical signals of wavelength $\lambda_1$, a first control section for controlling the state of said first optical switch based on said switch control signals received by said first data transfer section, a delay time calculation section for determining a first delay time by adding values of said first phase difference data and said second phase difference data, and dividing a resulting sum by 2, and a phase control section for generating phase signals synchronized with reference phase signals generated by said transmitting device by adjusting the phase of said first phase signals based on said first delay time determined by said delay time calculation section; and said transmitting device, connected to the receiving device via the optical fiber, comprising a reference oscillator for generating reference phase signals, a second optical transmitter for generating optical signals of the first wavelength $\lambda_1$ modulated by the reference signals generated by said reference oscillator, a third optical transmitter for generating optical signals of the second wavelength $\lambda_2$ modulated by the reference signals generated by said reference oscillator, a second optical multiplexer for combining the optical signals of wavelength $\lambda_1$ generated by said second optical transmitter and the optical signals of wavelength $\lambda_2$ generated by said third optical transmitter, sending the combined optical signals to the optical fiber connected to said receiving device provided in a slave device, receiving optical signals from said optical fiber, and separating optical signals of wavelength $\lambda_2$ from the received optical signals, a third optical receiver for separating phase signals from said optical signals of wavelength $\lambda_2$ separated by said second optical multiplexer, a second phase comparator for determining a phase difference between said reference phase signals and said separated phase signals by determining a sum of a first delay time for said optical signals of wavelength $\lambda_1$ to travel from the transmitting device to said receiving device and a second delay time for said optical signals of wavelength $\lambda_2$ to travel from said receiving device to the transmitting device, and outputting first phase difference data indicating said phase difference, a second optical switch for switching between a first state wherein optical signals of wavelength $\lambda_2$ separated by said second optical multiplexer are inputted into said third optical receiver and a second state wherein optical signals of wavelength $\lambda_2$ generated by said third optical transmitter are inputted into said second optical multiplexer, a second control section for controlling the state of said second optical switch and outputting switch control signals indicating the control state, and a second data transfer section for sending out said switch control signals outputted by said second control section and said first phase difference data outputted by said second phase comparator, said second data transfer section superimposing said first phase difference data and said switch control signals onto said optical signals of wavelength $\lambda_1$.

11. A phase synchronization system, comprising:

a receiving device, connected to an optical fiber, comprising a first optical multiplexer for receiving optical signals from the optical fiber connected to a transmitting device provided in a master or slave device, and separating said optical signals into optical signals of a first wavelength $\lambda_1$ and optical signals of a second wavelength $\lambda_2$, a first optical receiver for separating first phase signals from said optical signals of wavelength $\lambda_1$, a second optical receiver for separating second phase signals from said optical signals of wavelength $\lambda_2$, a first phase comparator for determining a phase difference between said first phase signals and said second phase signals by determining a difference between a first delay time for said optical signals of wavelength $\lambda_1$ to travel from said transmitting device to the receiving device and a second delay time for said optical signals of wavelength $\lambda_2$ to travel from said transmitting device to the receiving device, and outputting second phase difference data indicating said phase difference, a first optical transmitter for generating optical signals of wavelength $\lambda_2$ modulated by said first phase signals, and sending said optical signals through said first optical multiplexer to said optical fiber, a first optical switch for switching between a first state wherein optical signals of wavelength $\lambda_2$ generated by said first optical transmitter are inputted into said first optical multiplexer and a second state wherein optical signals of wavelength $\lambda_2$ separated by said first optical multiplexer are inputted into said second optical receiver, a first data transfer section for receiving switch control signals for switching between the states of said first optical switch and first phase difference data indicating a sum of said first delay time and said second delay time, a first control section for controlling the state of said first optical switch based on said switch control signals received by said first data transfer section, a first delay time calculation section for determining a first delay time by adding values of said first phase difference data and said second phase difference data, and dividing a resulting sum by 2, and a first phase control section for generating phase signals synchronized with reference phase signals generated by said transmitting device by adjusting the phase of said first phase signals based on said first delay time determined by said delay time calculation section:

a transmitting device, connected to the receiving device via the optical fiber, comprising a first reference oscillator for generating reference phase signals, a second optical transmitter for generating optical signals of the first wavelength $\lambda_1$ modulated by the reference signals generated by said reference oscillator, a third optical transmitter for generating optical signals of the second wavelength $\lambda_2$ modulated by the reference signals generated by said reference oscillator, a second optical multiplexer for combining the optical signals of wavelength $\lambda_1$ generated by said second optical transmitter and the optical signals of wavelength $\lambda_2$ generated by said third optical transmitter, sending the combined optical signals to the optical fiber connected to said receiving device provided in a slave device, receiving optical signals from said optical fiber, and separating optical signals of wavelength $\lambda_2$ from the received optical signals, a third optical receiver for separating phase signals from said optical signals of wavelength $\lambda_2$ separated by said second optical multiplexer, a second phase comparator for determining a phase difference between said reference phase signals and said separated phase signals by determining a sum of a first delay time for said optical signals of wavelength $\lambda_1$ to travel from the transmitting device to said receiving device and a second delay time for said optical signals of wavelength $\lambda_2$ to travel from said receiving device to the transmitting device, and outputting first phase difference data indicating said phase difference, a second optical switch for switching between a first state wherein optical signals of wavelength $\lambda_2$ separated by said second optical multiplexer are inputted into said third optical receiver and a second state wherein optical signals of wavelength $\lambda_2$ generated by said third optical transmitter are inputted into said second optical multiplexer, a second control section for controlling the state of said second optical switch and outputting switch control signals indicating the control state, and a second data transfer section for sending out said switch control signals outputted by said second control section and said first phase difference data outputted by said second phase comparator; and at least one transmitting/receiving device, connected to the receiving device and the transmitting device via the optical fiber, comprising a receiving element, connected to the optical fiber, comprising a third optical multiplexer for receiving optical signals from the optical fiber connected to the transmitting device provided in a master or slave device, and separating said optical signals into optical signals of a first wavelength $\lambda_1$ and optical signals of a second wavelength $\lambda_2$, a fourth optical receiver for separating first phase signals from said optical signals of wavelength $\lambda_1$, a fifth optical receiver for separating second phase signals from said optical signals of wavelength $\lambda_2$, a third phase comparator for determining a phase difference between said first phase signals and said second phase signals by determining a difference between a first delay time for said optical signals of wavelength $\lambda_1$ to travel from said transmitting device to the receiving element and a second delay time for said optical signals of wavelength $\lambda_2$ to travel from said transmitting device to the receiving element, and outputting second phase difference data indicating said phase difference, a fourth optical transmitter for generating optical signals of wavelength $\lambda_2$ modulated by said first phase signals, and sending said optical signals through said third optical multiplexer to said optical fiber, a third optical switch for switching between a first state wherein optical signals of wavelength $\lambda_2$ generated by said fourth optical transmitter are inputted into said third optical multiplexer and a second state wherein optical signals of wavelength $\lambda_2$ separated by said third optical multiplexer are inputted into said fifth optical receiver, a third data transfer section for receiving switch control signals for switching between the states of said third optical switch and first phase difference data indicating a sum of said first delay time and said second delay time, a third control section for controlling the state of said third optical switch based on said switch control signals received by said third data transfer section, a second delay time calculation section for determining a first delay time by adding values of said first phase difference data and said second phase difference data, and dividing a resulting sum by 2, and a second phase control section for generating phase signals synchronized with reference phase signals generated by said transmitting device by adjusting the phase of said first phase signals based on said first delay time determined by said delay time calculation section; and a transmitting element, connected to the optical fiber, comprising a second reference oscillator for generating reference phase signals from the phase signals generated by the second phase control section, a fifth optical transmitter for generating optical signals of the first wavelength $\lambda_1$ modulated by the reference signals generated by said reference oscillator, a sixth optical transmitter for generating optical signals of the second wavelength $\lambda_2$ modulated by the reference signals generated by said reference oscillator, a fourth optical multiplexer for combining the optical signals of wavelength $\lambda_1$ generated by said fifth optical transmitter and the optical signals of wavelength $\lambda_2$ generated by said sixth optical transmitter, sending the combined optical signals to the optical fiber connected to said receiving device provided in a slave device, receiving optical signals from said optical fiber, and separating optical signals of wavelength $\lambda_2$ from the received optical signals, a sixth optical receiver for separating phase signals from said optical signals of wavelength $\lambda_2$ separated by said fourth optical multiplexer, a fourth phase comparator for determining a phase difference between said reference phase signals and said separated phase signals by determining a sum of a first delay time for said optical signals of wavelength $\lambda_1$ to travel from the transmitting element to said receiving device and a second delay time for said optical signals of wavelength $\lambda_2$ to travel from said receiving device to the transmitting element, and outputting first phase difference data indicating said phase difference, a fourth optical switch for switching between a first state wherein optical signals of wavelength $\lambda_2$ separated by said fourth optical multiplexer are inputted into said sixth optical receiver and a second state wherein optical signals of wavelength $\lambda_2$ generated by said sixth optical transmitter are inputted into said fourth optical multiplexer, a fourth control section for controlling the state of said fourth optical switch and outputting switch control signals indicating the control state, and a fourth data transfer section for sending out said switch control signals outputted by said fourth control section and said first phase difference data outputted by said fourth phase comparator.

12. A phase synchronization system, comprising:

a receiving device, connected to an optical fiber, comprising a first optical multiplexer for receiving optical signals from the optical fiber connected to a transmitting device provided in a master or slave device, and separating said optical signals into optical signals of a first wavelength $\lambda_1$ and optical signals of a second wavelength $\lambda_2$, a first optical receiver for separating first phase signals from said optical signals of wavelength $\lambda_1$, a second optical receiver for separating second phase signals from said optical signals of wavelength $\lambda_2$, a first phase comparator for determining a phase difference between said first phase signals and said second phase signals by determining a difference between a first delay time for said optical signals of wavelength $\lambda_1$ to travel from said transmitting device to the receiving device and a second delay time for said optical signals of wavelength $\lambda_2$ to travel from said transmitting device to the receiving device, and outputting second phase difference data indicating said phase difference, a first optical transmitter for generating optical signals of wavelength $\lambda_2$ modulated by said first phase signals, and sending said optical signals through said first optical multiplexer to said optical fiber, a first optical switch for switching between a first state wherein optical signals of wavelength $\lambda_2$ generated by said first optical transmitter are inputted into said first optical multiplexer and a second state wherein optical signals of wavelength $\lambda_2$ separated by said first optical multiplexer are inputted into said second optical receiver, a first data transfer section for receiving switch control signals for switching between the states of said first optical switch and first phase difference data indicating a sum of said first delay time and said second delay time, and for separating said first phase difference data and said switch control signals, which have been superimposed into said optical signals of wavelength $\lambda_1$, from said optical signals of wavelength $\lambda_1$, a first control section for controlling the state of said first optical switch based on said switch control signals received by said first data transfer section, a first delay time calculation section for determining a first delay time by adding values of said first phase difference data and said second phase difference data, and dividing a resulting sum by 2, and a first phase control section for generating phase signals synchronized with reference phase signals generated by said transmitting device by adjusting the phase of said first phase signals based on said first delay time determined by said delay time calculation section;

a transmitting device, connected to the receiving device via the optical fiber, comprising a first reference oscillator for generating reference phase signals, a second optical transmitter for generating optical signals of the first wavelength $\lambda_1$ modulated by the reference signals generated by said reference oscillator, a third optical transmitter for generating optical signals of the second wavelength $\lambda_2$ modulated by the reference signals generated by said reference oscillator, a second optical multiplexer for combining the optical signals of wavelength $\lambda_1$ generated by said second optical transmitter and the optical signals of wavelength $\lambda_2$ generated by said third optical transmitter, sending the combined optical signals to the optical fiber connected to said receiving device provided in a slave device, receiving optical signals from said optical fiber, and separating optical signals of wavelength $\lambda_2$ from the received optical signals, a third optical receiver for separating phase signals from said optical signals of wavelength $\lambda_2$ separated by said second optical multiplexer, a second phase comparator for determining a phase difference between said reference phase signals and said separated phase signals by determining a sum of a first delay time for said optical signals of wavelength $\lambda_1$ to travel from the transmitting device to said receiving device and a second delay time for said optical signals of wavelength $\lambda_2$ to travel from said receiving device to the transmitting device, and outputting first phase difference data indicating said phase difference, a second optical switch for switching between a first state wherein optical signals of wavelength $\lambda_2$ separated by said second optical multiplexer are inputted into said third optical receiver and a second state wherein optical signals of wavelength $\lambda_2$ generated by said third optical transmitter are inputted into said second optical multiplexer, a second control section for controlling the state of said second optical switch and outputting switch control signals indication the control state, and a second data transfer section for sending out said switch control signals outputted by said second control section and said first phase difference data outputted by said second phase comparator, said second data transfer section superimposing said first phase difference data and said switch control signals onto said optical signals of wavelength $\lambda_1$; and at least one transmitting/receiving device, connected to the receiving device and the transmitting device via the optical fiber, comprising a receiving element, connected to the optical fiber, comprising a third optical multiplexer for receiving optical signals from the optical fiber connected to the transmitting device provided in a master or slave device, and separating said optical signals into optical signals of a first wavelength $\lambda_1$ and optical signals of a second wavelength $\lambda_2$, a fourth optical receiver for separating first phase signals from said optical signals of wavelength $\lambda_1$, a fifth optical receiver for separating second phase signals from said optical signals of wavelength $\lambda_2$, a third phase comparator for determining a phase difference between said first phase signals and said second phase signals by determining a difference between a first delay time for said optical signals of wavelength $\lambda_1$ to travel from said transmitting device to the receiving element and a second delay time for said optical signals of wavelength $\lambda_2$ to travel from said transmitting device to the receiving element, and outputting second phase difference data indicating said phase difference, a fourth optical transmitter for generating optical signals of wavelength $\lambda_2$ modulated by said first phase signals, and sending said optical signals through said third optical multiplexer to said optical fiber, a third optical switch for switching between a first state wherein optical signals of wavelength $\lambda_2$ generated by said fourth optical transmitter are inputted into said third optical multiplexer and a second state wherein optical signals of wavelength $\lambda_2$ separated by said third optical multiplexer are inputted into said fifth optical receiver, a third data transfer section for receiving switch control signals for switching between the states of said third optical switch and first phase difference data indicating a sum of said first delay time and said second delay time, and for separating said first phase difference data and said switch control signals, which have been superimposed onto said optical signals of wavelength $\lambda_1$, from said optical signals of wavelength $\lambda_1$, a third control section for controlling the state of said third optical switch based on said switch control signals received by said third data transfer section, a second delay time calculation section for determining a first delay time by adding values of said first phase difference data and said second phase difference data, and dividing a resulting sum by 2, and a second phase control section for generating phase signals synchronized with reference phase signals generated by said transmitting device by adjusting the phase of said first phase signals based on said first delay time determined by said delay time calculation section; and a transmitting element, connected to the optical fiber, comprising a second reference oscillator for generating reference phase signals from the phase signals generated by the second phase control section, a fifth optical transmitter for generating optical signals of the first wavelength $\lambda_1$ modulated by the reference signals generated by said reference oscillator, a sixth optical transmitter for generating optical signals of the second wavelength $\lambda_2$ modulated by the reference signals generated by said reference oscillator, a fourth optical multiplexer for combining the optical signals of wavelength $\lambda_1$ generated by said fifth optical transmitter and the optical signals of wavelength $\lambda_2$ generated by said sixth optical transmitter, sending the combined optical signals to the optical fiber connected to said receiving device provided in a slave device, receiving optical signals from said optical fiber, and separating optical signals of wavelength $\lambda_2$ from the received optical signals, a sixth optical receiver for separating phase signals from said optical signals of wavelength $\lambda_2$ separated by said fourth optical multiplexer, a fourth phase comparator for determining a phase difference between said reference phase signals and said separated phase signals by determining a sum of a first delay time for said optical signals of wavelength $\lambda_1$ to travel from the transmitting element to said receiving device and a second delay time for said optical signals of wavelength $\lambda_2$ to travel from said receiving device to the transmitting element, and outputting first phase difference data indicating said phase difference, a fourth optical switch for switching between a first state wherein optical signals of wavelength $\lambda_2$ separated by said fourth optical multiplexer are inputted into said sixth optical receiver and a second state wherein optical signals of wavelength $\lambda_2$ generated by said sixth optical transmitter are inputted into said fourth optical multiplexer, a fourth control section for controlling the state of said fourth optical switch and outputting switch control signals indicating the control state, and a fourth data transfer section for sending out said switch control signals outputted by said fourth control section and said first phase difference data outputted by said fourth phase comparator, the fourth data transfer section superimposing said first phase difference data and said switch control signals onto said optical signals of wavelength $\lambda_1$.

13. A phase synchronization system according to either of claims 9 or 11, wherein relay devices are placed between the devices within the system, each of said relay devices comprising:

a first optical multiplexer for receiving optical signals from an optical fiber connected to a transmitting device provided in a master device or a slave device;

a first optical relay for relaying optical signals of wavelength $\lambda_1$ separated by said first optical multiplexer;

a second optical relay for relaying optical signals of wavelength $\lambda_2$ separated by said first optical multiplexer;

a second optical multiplexer for combining said optical signals of wavelength $\lambda_1$ relayed by said first optical relay and said optical signals of wavelength $\lambda_2$ relayed by said second optical relay, sending the combined optical signals to an optical fiber connected to a receiving device provided in a slave device different from the above-mentioned slave device, receiving optical signals from said optical fiber connected to said receiving device, and separating optical signals of wavelength $\lambda_2$ from the received optical signals;

a third optical relay for relaying said optical signals of wavelength $\lambda_2$ separated by said second optical multiplexer;

an optical switch for switching between a first state wherein optical signals of wavelength $\lambda_2$ separated by said second optical signals of wavelength $\lambda_2$ separated by said second optical multiplexer are inputted into said third optical relay and optical signals of wavelength $\lambda_2$ relayed by said third optical relay are inputted into said first optical multiplexer, and a second state wherein optical signals of wavelength $\lambda_2$ separated by said first optical multiplexer are inputted into said second optical relay and optical signals of wavelength $\lambda_2$ relayed by said second optical relay are inputted into said second optical multiplexer;

a data transfer section for receiving said switch control signals and said first phase difference data from said transmitting device, and sending said switch control signals and said first phase difference data to said receiving device; and a control section for controlling the state of said optical switch based on the switch control signals received by said data transfer section.

14. A phase synchronization system according to either of claims 10 or 12, wherein relay devices are placed between the devices within the system, each of said relay devices comprising:

a first optical multiplexer for receiving optical signals from an optical fiber connected to a transmitting device provided in a master device or a slave device;

a first optical relay for relaying optical signals of wavelength $\lambda_1$ separated by said first optical multiplexer and separating switch control signals from said optical signals of wavelength $\lambda_1$;

a second optical relay for relaying optical signals of wavelength $\lambda_2$ separated by said first optical multiplexer;

a second optical multiplexer for combining said optical signals of wavelength $\lambda_1$ relayed by said first optical relay and said optical signals of wavelength $\lambda_2$ relayed by said second optical relay, sending the combined optical signals to an optical fiber connected to a receiving device provided in a slave device different from the above-mentioned slave device, receiving optical signals from said optical fiber connected to said receiving device, and separating optical signals of wavelength $\lambda_2$ from the received optical signals;

a third optical relay for relaying said optical signals of wavelength $\lambda_2$ separated by said second optical multiplexer;

an optical switch for switching between a first state wherein optical signals of wavelength $\lambda_2$ separated by said second optical multiplexer are inputted into said third optical relay and optical signals of wavelength $\lambda_2$ relayed by said third optical relay are inputted into said first optical multiplexer, and a second state wherein optical signals of wavelength $\lambda_2$ separated by said first optical multiplexer are inputted into said second optical relay and optical signals of wavelength $\lambda_2$ relayed by said second optical relay are inputted into said second optical multiplexer; and a control section for controlling the state of said optical switch based on the switch control signals separated by said first optical relay.

15. A phase synchronization system according to either of claims 10 or 12, wherein relay devices are placed between the devices within the system, each of said relay devices comprising:

optical amplification means for receiving optical signals from an optical fiber connected to a transmitting device provided in a master device or a slave device, amplifying the received optical signals by means of excitation light, sending the amplified optical signals to an optical fiber connected to a receiving device provided in a slave device different from the above-mentioned slave device, receiving optical signals from the optical fiber connected to said receiving device, amplifying the received optical signals by means of excitation light, and sending said amplified optical signals to an optical fiber connected to said transmitting device;

an excitation light source for emitting said excitation light; and excitation light input means for inputting the excitation light emitted from said excitation light source into said optical amplification means.

* * * * *

UNITED STATES PATENT AND TRADEMARK OFFICE
CERTIFICATE OF CORRECTION

PATENT NO. : 5,673,133
DATED : September 30, 1997
INVENTOR(S) : Atsushi Imaoka et al.

It is certified that error appears in the above-indentified patent and that said Letters Patent is hereby corrected as shown below:

Claim 7, Column 14, Line 60, "time." should read --time,--.

Claim 8, Column 16, Line 21, "wavelength$\lambda_2$" should read --wavelength $\lambda_2$--.

Claim 9, Column 18, Line 36, "form" should read --from--.

Claim 12, Column 24, Line 9, "into" should read --onto--;

Claim 12, Column 24, Line 67, "indication" should read --indicating--.

Claim 13, Column 27, Lines 14-15, after "optical", delete "signals of wavelength $\lambda_2$ separated by said second optical".

Signed and Sealed this

Third Day of March, 1998

Attest:

BRUCE LEHMAN

*Attesting Officer*     Commissioner of Patents and Trademarks